US012524146B2

(12) United States Patent
Boyd et al.

(10) Patent No.: US 12,524,146 B2
(45) Date of Patent: Jan. 13, 2026

(54) USER INTERFACE INCLUDING MULTIPLE INTERACTION ZONES

(71) Applicant: Snap Inc., Santa Monica, CA (US)

(72) Inventors: Nathan Kenneth Boyd, Los Angeles, CA (US); Christie Marie Heikkinen, Sherman Oaks, CA (US); David Phillip Taitz, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 81 days.

(21) Appl. No.: 18/327,569

(22) Filed: Jun. 1, 2023

(65) Prior Publication Data

US 2023/0393730 A1  Dec. 7, 2023

Related U.S. Application Data

(60) Provisional application No. 63/365,651, filed on Jun. 1, 2022.

(51) Int. Cl.
*G06F 3/04886* (2022.01)
*G06F 3/0482* (2013.01)
(Continued)

(52) U.S. Cl.
CPC ........ *G06F 3/04886* (2013.01); *G06F 3/0482* (2013.01); *G06F 3/04883* (2013.01); *H04L 51/10* (2013.01)

(58) Field of Classification Search
CPC .............. G06F 3/04886; G06F 3/0482; G06F 3/04883; H04L 51/10
See application file for complete search history.

(56) References Cited

U.S. PATENT DOCUMENTS

| 7,971,156 B2 | 6/2011 | Albertson et al. |
| 7,996,793 B2 | 8/2011 | Latta et al. |

(Continued)

FOREIGN PATENT DOCUMENTS

| CN | 103049761 | 8/2016 |
| EP | 3707693 | 9/2020 |

(Continued)

OTHER PUBLICATIONS

"Surprise!", [Online] Retrieved from the Internet: <URL: https://www.snap.com/en-US/news/post/surprise>, (Oct. 3, 2013), 1 pg.

(Continued)

*Primary Examiner* — Angie Badawi
(74) *Attorney, Agent, or Firm* — Schwegman Lundberg & Woessner, P.A.

(57) ABSTRACT

A content request is received from a user device of a viewing user of an interaction system. An interaction application executing at the user device presents a viewing user interface that includes a content zone and an interaction zone. A third-party content item is presented in the content zone. The interaction zone comprises a first interaction subzone located in a lower section of the viewing user interface, outside of the content zone. The first interaction subzone includes a user-selectable interaction element. The interaction zone further comprises a second interaction subzone positioned adjacent to the first interaction subzone in the lower section of the viewing user interface. The second interaction subzone is located inside of the content zone and includes a user-selectable context element. Responsive to detecting an interaction gesture directed at the interaction zone, the interaction application automatically transitions from a viewing state to an interaction state.

19 Claims, 22 Drawing Sheets

(51) Int. Cl.
  *G06F 3/04883* (2022.01)
  *H04L 51/10* (2022.01)

(56) References Cited

U.S. PATENT DOCUMENTS

| | | |
|---|---|---|
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,817,142 B1 | 10/2020 | Paul |
| 10,942,978 B1 | 3/2021 | Paul |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,188,215 B1 | 11/2021 | Holland |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2006/0085812 A1* | 4/2006 | Shishegar ............ H04H 60/44 725/19 |
| 2009/0012788 A1 | 1/2009 | Gilbert et al. |
| 2011/0301934 A1 | 12/2011 | Tardif |
| 2013/0226453 A1 | 8/2013 | Trussel et al. |
| 2014/0171036 A1 | 6/2014 | Simmons |
| 2015/0120293 A1 | 4/2015 | Wohlert et al. |
| 2015/0160808 A1* | 6/2015 | Walkin ................ G06Q 10/00 715/800 |
| 2015/0370320 A1 | 12/2015 | Connor |
| 2016/0324488 A1* | 11/2016 | Olsen .................. A61B 5/0205 |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2019/0146219 A1 | 5/2019 | Rodriguez, II |
| 2020/0287860 A1 | 9/2020 | Stamatiou et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0226908 A1 | 7/2021 | Al Majid et al. |
| 2021/0241529 A1 | 8/2021 | Cowburn et al. |
| 2021/0286939 A1 | 9/2021 | Biran et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0101606 A1 | 3/2022 | Canberk et al. |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2024/0012558 A1 | 1/2024 | Boyd et al. |

FOREIGN PATENT DOCUMENTS

| | | |
|---|---|---|
| EP | 4172726 | 5/2023 |
| EP | 4172730 | 5/2023 |
| KR | 20220158824 | 12/2022 |
| WO | 2016168591 | 10/2016 |
| WO | 2018236601 | 12/2018 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"International Application Serial No. PCT/US2023/024146, International Search Report mailed Sep. 21, 2023", 3 pgs.

"International Application Serial No. PCT/US2023/024146, Written Opinion mailed Sep. 21, 2023", 4 pgs.

"International Application Serial No. PCT/US2023/069580, International Search Report mailed Oct. 20, 2023", 3 pgs.

"International Application Serial No. PCT/US2023/069580, Written Opinion mailed Oct. 20, 2023", 4 pgs.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo and Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"U.S. Appl. No. 18/346,638, Non Final Office Action mailed Apr. 2, 2025", 18 pgs.

"International Application Serial No. PCT/US2023/024146, International Preliminary Report on Patentability mailed Dec. 12, 2024", 6 pgs.

"International Application Serial No. PCT/US2023/069580, International Preliminary Report on Patentability mailed Jan. 16, 2025", 6 pgs.

"U.S. Appl. No. 18/346,638, Examiner Interview Summary mailed Jun. 30, 2025", 2 pgs.

"U.S. Appl. No. 18/346,638, Response filed Jul. 1, 2025 to Non Final Office Action mailed Apr. 2, 2025", 12 pgs.

"European Application Serial No. 23816746.4, Response to Communication pursuant to Rules 161(2) and 162 EPC filed Jul. 11, 2025", 17 pgs.

"European Application Serial No. 23836218.0, Response to Communication pursuant to Rules 161(1) and 162 EPC filed Jul. 24, 2025", w/ English Claims, 10 pgs.

* cited by examiner

USER INTERFACE INCLUDING MULTIPLE INTERACTION ZONES

CLAIM OF PRIORITY

This application claims the benefit of priority to U.S. Provisional Application Ser. No. 63/365,651, filed on Jun. 1, 2022, which is incorporated herein by reference in its entirety.

TECHNICAL FIELD

The present disclosure relates, generally, to electronic content sharing. More specifically, subject matter disclosed herein relates to systems and methods that utilize user interfaces with multiple interaction zones to facilitate content generation or user interactions.

BACKGROUND

The popularity of computer-implemented programs that permit users to access and interact with content and other users online continues to grow. Various computer-implemented applications exist that permit users to share content with other users through interaction applications, e.g., messaging clients or content sharing clients. Some computer-implemented applications can be designed to run on a mobile device, such as a phone, a tablet, or a wearable device, while having a backend service provided on a server computer system to perform certain operations, e.g., those that may require resources greater than is reasonable to perform at a user device.

An interaction application, such as a messaging client executing at a user device, may enable a sharing user to capture a photo or video, and to share captured or viewed content to another device for viewing by a viewing user. The captured content may be augmented with items such as filters, media overlays, augmented reality effects, links, or the like. A viewing user may interact with the shared content or the sharing user in various ways via the interaction application, e.g., by sending a reply message to the sharing user, or by capturing and sharing a further photo or video in response to the content shared by the sending user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
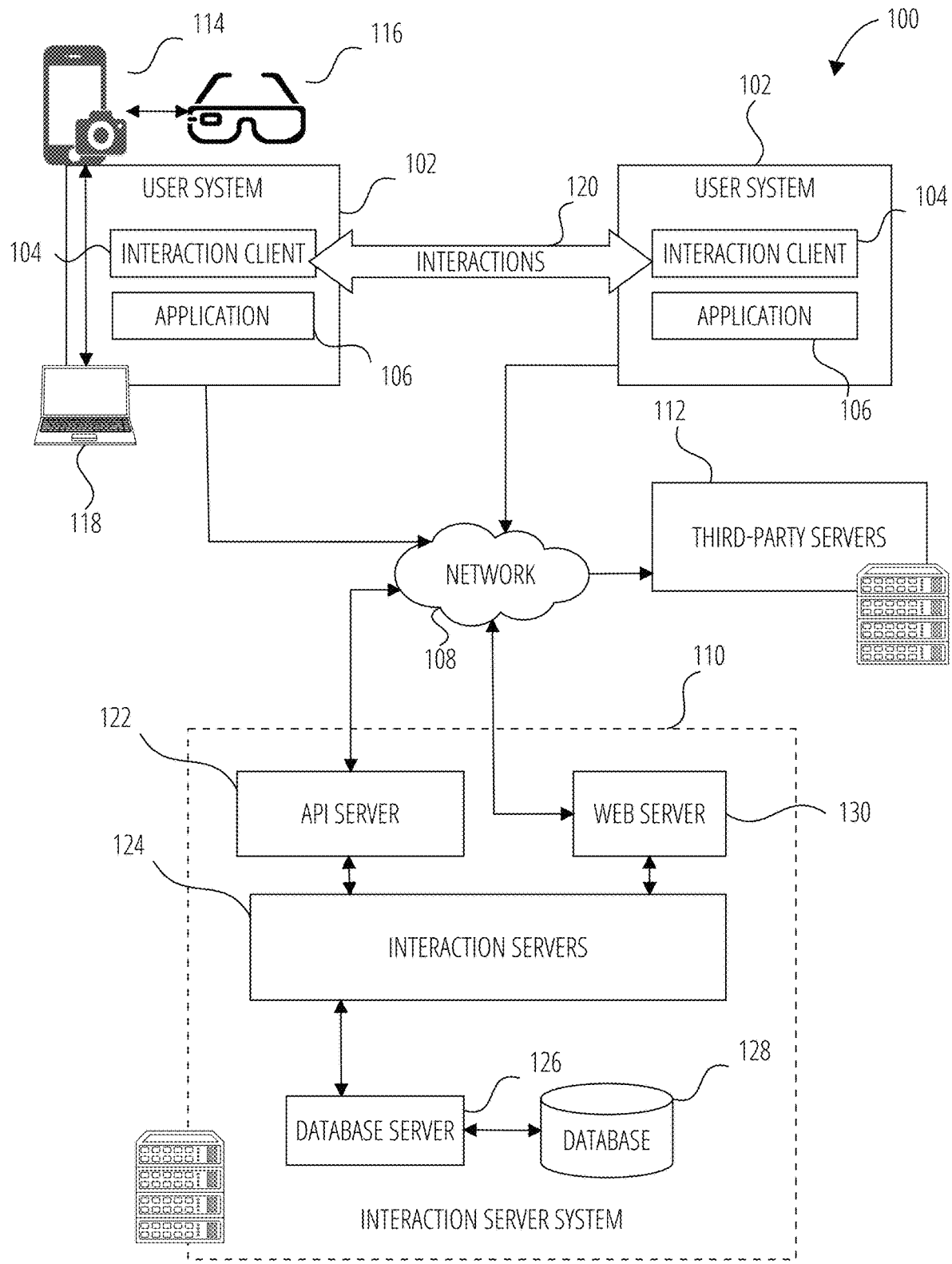
FIG. 1 is a diagrammatic representation of a networked environment in which the present disclosure may be deployed, according to some examples.

Examples of the present disclosure provide enhanced user interfaces for viewing and interacting with content, including user input content items forming part of content collections. A viewing user interface includes a regular interaction zone that is extended by the addition of an extended interaction zone, creating a more user-friendly, efficient, or "feed-like" experience.

The extended interaction zone may provide user-selectable contextual information with respect to a user input content item (e.g., a third-party content item) presented within the viewing user interface. The extended interaction zone may further provide additional options, such as relationship establishment actions. The regular interaction zone or the extended interaction zone may be populated based on whether a relationship exists between a viewing user and a sharing user, based on a type of relationship between the users, based on a context of the user input content item, or based on combinations thereof.

In some examples, an interaction application executing at a user device presents a viewing user interface that includes a content zone and an interaction zone. A third-party content item is presented in the content zone. In cases where the third-party content item forms part of a content collection, the content collection may be navigable by performing a navigation gesture. The navigation gesture may comprise a tapping gesture, e.g., in a navigation zone located inside of the content zone, but outside of the interaction zone. For example, a tapping gesture in a left navigation zone may cause navigation to a previous item in the content collection, while a tapping gesture in a right navigation zone may cause navigation to a next item in the content collection.

The interaction zone may comprise a first interaction subzone (e.g., regular interaction zone) located in a lower section of the viewing user interface outside of the content zone. In some examples, the first interaction subzone is located below the third-party content item. The first interaction subzone may include one or more user-selectable interaction elements, e.g., messaging or reply buttons, or alternative interaction elements based on a determined context.

The interaction zone may further comprise a second interaction subzone (e.g., extended interaction zone) positioned adjacent to the first interaction subzone in the lower section of the viewing user interface. In some examples, the second interaction subzone is directly adjacent to the first interaction subzone, e.g., bordering the first interaction subzone, but is located inside of the content zone. In some examples, the interaction zone includes one or more user-selectable context elements overlaid on the third-party content item.

Responsive to detecting an interaction gesture directed at the interaction zone, the interaction application automatically transitions from a viewing state to an interaction state. In some examples, a swiping gesture within the interaction zone (directed at one or both of the subzones) may cause the transition from the viewing state to the interaction state. The interaction state may be a reply state in which a reply user interface is presented, a content creation state in which the viewing user can create a new user input content item based on a context of the third-party content item, or an alternative interaction state, such as a "read more" state involving presentation of further information regarding the third-party content item.

User interfaces that are difficult to navigate, confusing, or slow, can lead to a negative user experience or reduced efficiencies (e.g., as a result of slower interactions or selection errors). Moreover, this may increase the computing resources that are generally required to facilitate electronic interactions. Examples of the present disclosure may address such technical problems by providing improved user interface arrangements, mappings, and gesture response mechanisms, thereby allowing for a more user-friendly and efficient experience.

User interfaces that include individual interface elements, or sets of elements, that are sub-optimally positioned relative to other elements, may create confusion, or otherwise reduce ease of navigation. Examples of the present disclosure may address technical problems in this regard by improved positioning, including relative positioning, of interface elements, providing a more intuitive and efficient design. Examples of the present disclosure may thus facilitate easier, or faster, interactions between users in an electronic interaction system, while providing users with useful context information and allowing them to express themselves creatively.

When the effects in this disclosure are considered in aggregate, one or more of the methodologies described herein may obviate a need for certain efforts or resources that otherwise would be involved in executing interaction applications. Computing resources used by one or more machines, databases, or networks may be more efficiently utilized or even reduced, e.g., as a result of user interface streamlining, improved arrangement of interface elements, improved gesture response mechanisms, improved interaction efficiencies, or less navigation time required to achieve a result. Examples of such computing resources may include processor cycles, network traffic, memory usage, graphics processing unit (GPU) resources, data storage capacity, power consumption, and cooling capacity.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. The interaction client 104 is an example of an interaction application which may, for example, be a messaging application, a media application, a user networking application, communication application, or combinations thereof. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within an entity graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112, for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
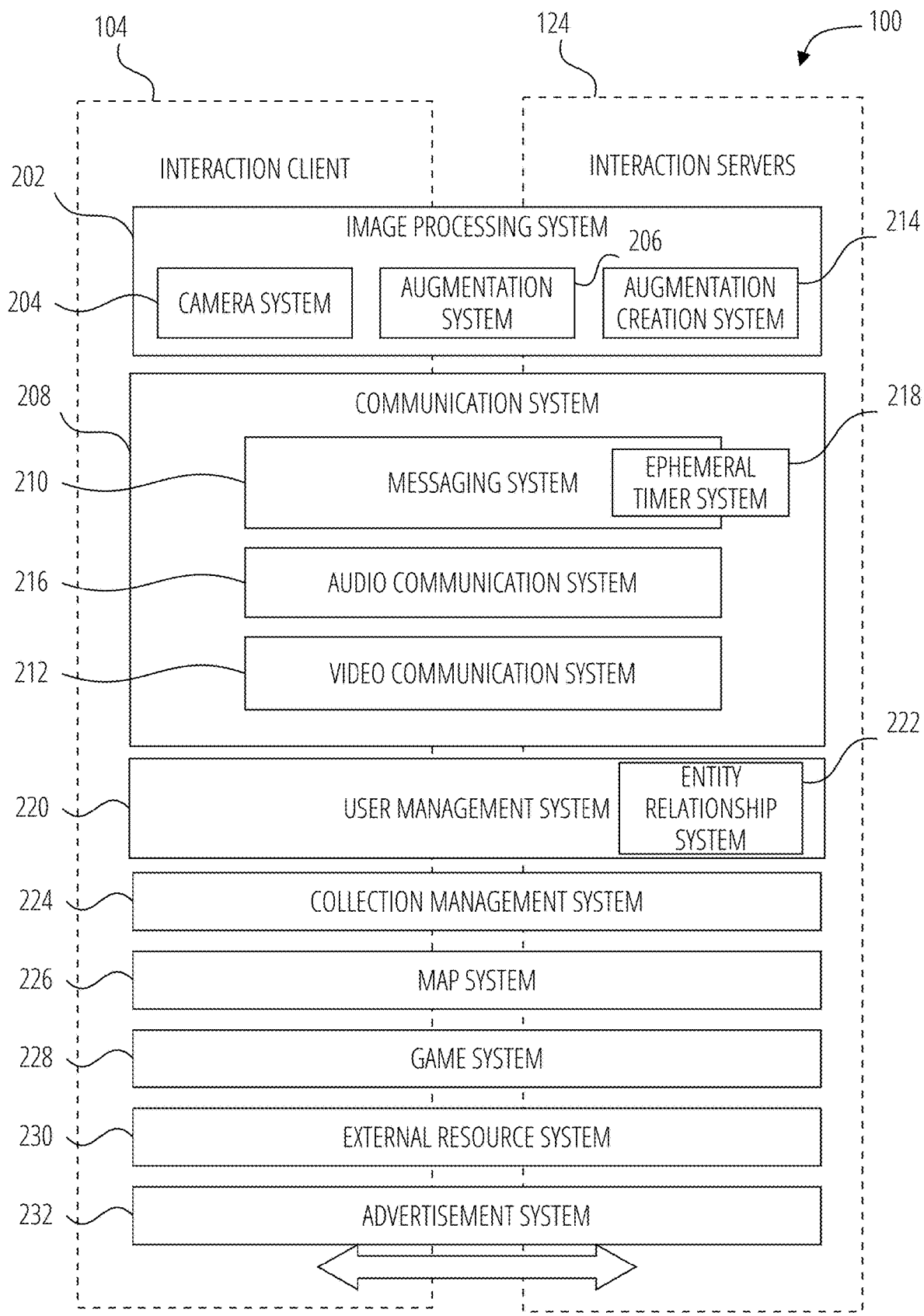
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 2002 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a user input content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an entity relationship system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content. The collection management system 224 may communicate with the messaging system 210 to enable users to reply to user input content items forming part of content collections, e.g., for a user to reply to a specific item forming part of another user's "story."

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
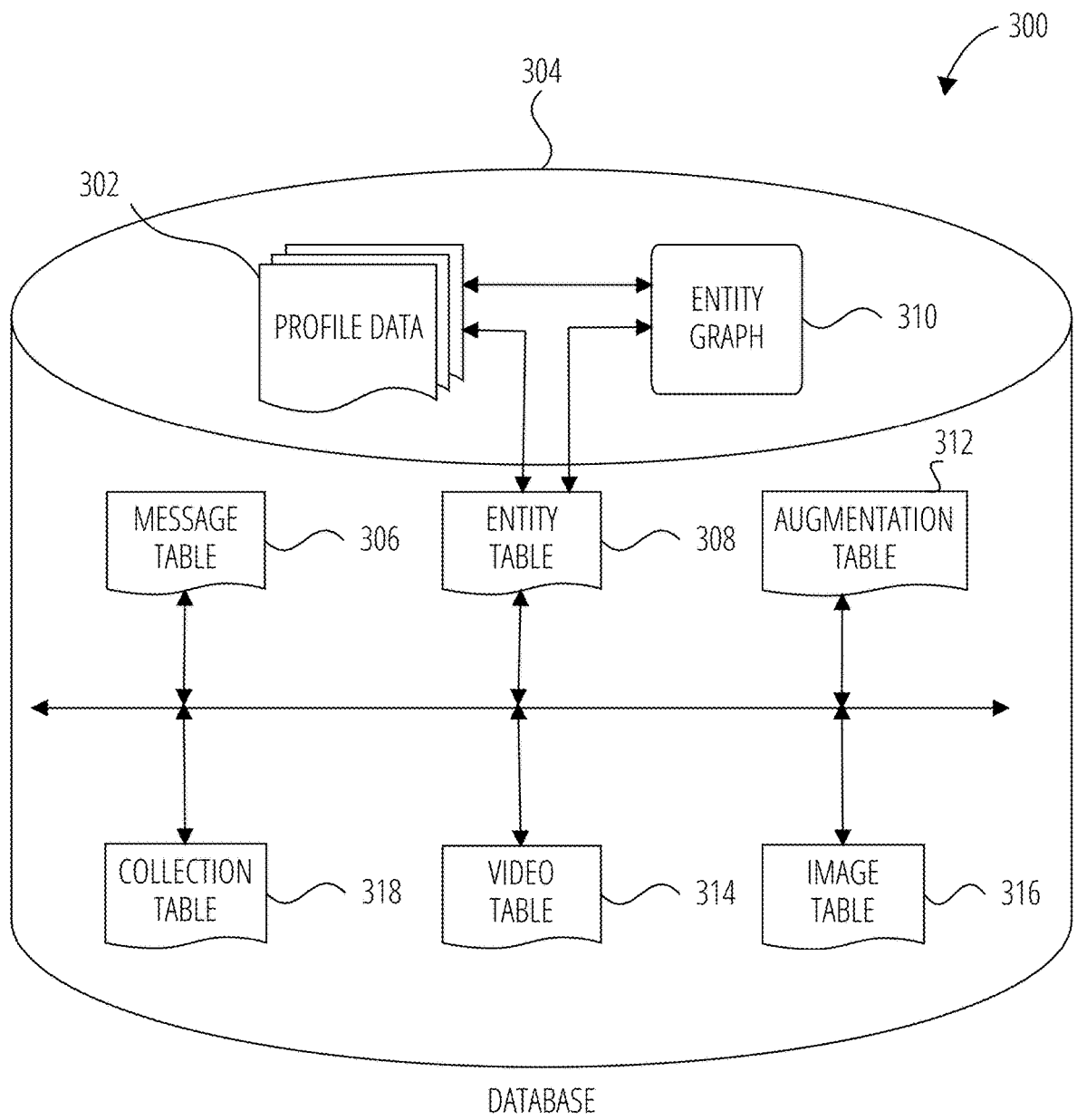
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 19.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example.

Generally, examples disclosed herein refer to relationships such as bidirectional relationships and one-directional relationships, and these relationships may be recorded in the entity table 308 or entity graph 310. A one-directional relationship may result from a user sending a relationship request to another user. As the other user may not have accepted that relationship request yet, the relationship is regarded as a one-directional relationship, in some examples. In other examples, such as in FIG. 8 below, a one-directional relationship may result from a user following or subscribing to content of another user, without the other user being requested or required to reciprocate. A bidirectional relationship may be established when one of the parties has extended an invitation or request to the other, and the other has accepted that invitation to establish the bidirectional relationship.

As a result of the establishment of a relationship, as recorded with the entity table 308 or entity graph 310 as a one-directional or a bidirectional relationship, certain automated information sharing may occur within the context of the interaction system 100 as a result of the establishment of that relationship. For example, where the interaction system 100 comprises an entity relationship system, such as a social media system, information, data and/or content relating to one entity may be shared according to the direction of the relationship. Where a one-directional relationship exists, information, data and/or content may be shared in the direction of that relationship. Where a bidirectional relationship exists, information, data and/or content sharing may be mutual and occur in both directions between the entities. Where interaction system 100 includes an entity relationship system, such as a social media system, shared information may include, for example, content that has been generated or shared by a user, geolocation information regarding the user, and certain profile or personal information. As part of a bidirectional relationship, the interaction system 100 may thus automatically share user-generated content and/or other data between the two users in the relationship, that would not be shared in the absence of such a relationship.

Privacy settings and systems provided by the interaction system 100 and any particular entity may specify which information is shared under each of a one-directional relationship or a bidirectional relationship with other entities. Privacy settings may also determine the type and extent of information shared, depending upon a classification, by the relevant entity, of the relationship type with another entity.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of an interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A collection table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Figure 4:
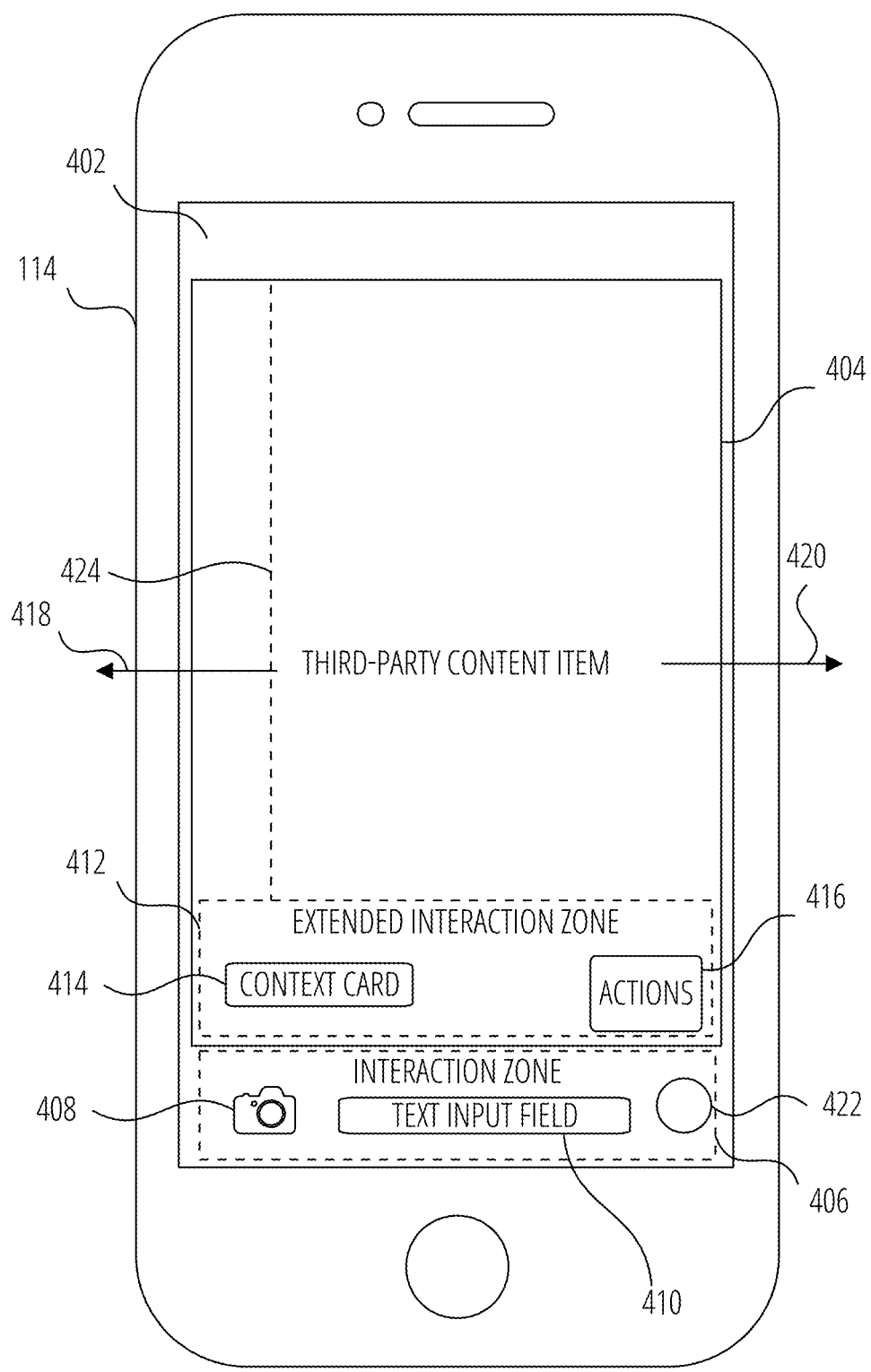
FIG. 4 is a user interface diagram illustrating a viewing user interface, according to some examples.

FIG. 4 is a user interface diagram depicting a viewing user interface 402, according to some examples, that may be presented by an interaction client 104 (as an example of an interaction application) executing on a mobile device 114. While the viewing user interface 402 is described as being presented on the screen of the mobile device 114, the viewing user interface 402 may also be presented using other types of devices that can provide suitable user interfaces or displays, e.g., the optical display of a head-wearable apparatus 116, a desktop computer, or via smart contact lenses.

The viewing user interface 402 displays a user input content item in the example form of a third-party content item 404. The area covered by the third-party content item 404 is referred to as a content zone. The third-party content item 404 may comprise image data, video data, audio data, text, or a combination of these data types, together with augmentation or modification data (e.g., stickers, filters, or lenses).

In some examples, the third-party content item 404 is part of a collection of third-party content items generated and published (or posted) by a third-party user of the interaction system 100. Such a collection may be referred to as a "story," and the third-party user may be referred to as a "sharing user," or "poster." The viewing user may navigate through the collection, e.g., by performing a suitable tapping gesture to move forward to a subsequent content item (see the arrow 420) or back to a previous content item (see the arrow 418) in the collection. In some examples, the collection may display each content item for a predefined time period before automatically proceeding to present the next content item in the collection (unless the user provides contrary user input during the predefined time period).

The viewing user interface 402 includes, in a lower section thereof, and as shown in FIG. 4, an interaction zone that comprises two subzones. The first subzone is a regular interaction zone 406 that includes one or more user-selectable interaction elements. The interaction zone 406 is located outside of the content zone (e.g., does not cover or overlap with the third-party content item 404) with its selectable elements at the bottom of the viewing user interface 402.

Figure 5:
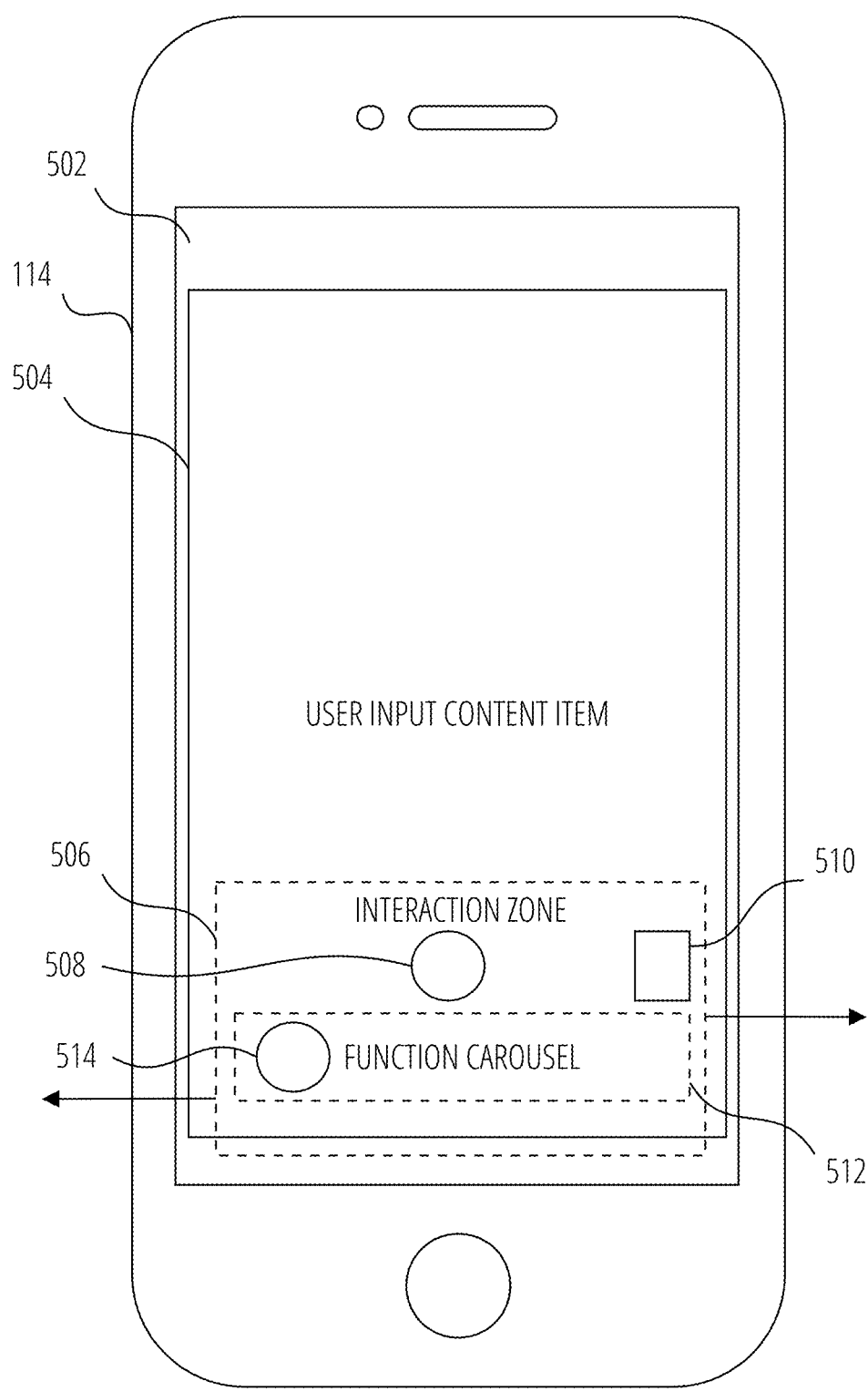
FIG. 5 is a user interface diagram illustrating a reply user interface, according to some examples.

In some examples, the interaction elements comprise a reply element that enables the viewing user to generate a reply message to the third-party content item. The reply element may comprise a reply camera element that is user-selectable to invoke a reply camera function of the interaction application. For example, a camera button 408 shown in FIG. 4 is user-selectable to invoke a reply camera function. The reply camera function enables a user to respond to the publication of the third-party content item 404 by a third-party user. This response may include a user input content item (e.g., a digital image captured using the camera of the mobile device 114). Additionally, the invoked reply camera function may enable the user to augment the user input content item with an augmentation, e.g., the same augmentation that is applied to the third-party content item 404. To this end, user selection of the camera button 408 causes the display of a reply camera user interface 502, as shown in FIG. 5, as part of the reply camera function.

A reply element may also be in the form of a text input field 410 that enables the viewing user to generate text of the reply message. FIG. 4 shows the text input field 410 into which a user can provide text to accompany a reply transmission to the third-party user, and also shows a share button 422 that a user can select to share the third-party content item 404, e.g., as a direct message to a third party user, to the viewing user's own "story," or to a third-party messaging application. The camera button 408, the text input field 410, and the share button 422 may form part of a tray that is displayed in the interaction zone 406, e.g., below the third-party content item 404, as is shown in FIG. 4.

The second subzone in the lower section of the viewing user interface 402 is an extended interaction zone 412. In some examples, and as shown in FIG. 4, the extended interaction zone 412 is an extension of the regular interaction zone 406 in the lower section of the viewing user interface 402, located within the content zone. The extended interaction zone 412 may be adjacent to, or may abut or border, the interaction zone 406, to provide the extension. Further, in some examples, and again as shown in FIG. 4, the extended interaction zone 412 is overlaid on the third-party content item 404 presented in the viewing user interface 402, while the regular interaction zone 406 is located below (and thus not overlaid on) the third-party content item 404. Thus, the extended interaction zone 412 may extend an overall interaction zone in the lower section of the viewing user interface 402 vertically upward over part of the third-party content item 404. The elements in the extended interaction zone 412 may be overlaid on the third-party content item 404 such that the third-party content item 404 remains partially visible within the viewing user interface 402, thus maintaining visual appeal.

The extended interaction zone 412 may include one or more user-selectable context elements overlaid on the third-party content item 404. For example, elements within the extended interaction zone 412 may be part of a context tray. The context elements may include, for example, an augmentation identifier, a location identifier, or a user identifier of the sharing user, or poster, as described further below.

Referring specifically to FIG. 4, the extended interaction zone 412 presents one or more context elements in the example form of context cards 414, each of the context cards providing context pertaining to the third-party content item 404. For example, a context card may present a user identifier, or poster identifier, that provides information regarding the third-party user that posted or published the third-party content item 404. This information may include a username and an avatar, for example. A further context card may identify one or more augmentations (e.g., image lenses or image filters) that have been applied to the third-party content item 404, while some context cards may provide location, time, and other metadata associated with the third-party content item 404.

The second subzone (extended interaction zone 412) may also include a set of user-selectable action elements presented in a stacked arrangement. Specifically, in the FIG. 4, the extended interaction zone 412 includes various actions 416 (e.g., stacked actions) that the active user may take with respect to the third-party content item 404. Examples of the actions 416 are described below.

In some cases, e.g., where the third-party content item 404 is part of a collection of content items, the viewing user can navigate between items in the collection by performing tapping gestures in predefined navigation zones of the viewing user interface 402. As shown in FIG. 4, the viewing user interface 402 may include two navigation zones, or tapping zones, located above the extended interaction zone 412 and separated by a vertical tap zone boundary 424. For example, if the user taps in the zone to the left of the tap zone boundary 424, the viewing user interface 402 may automatically transition to a previous or earlier content item in the collection, while if the user taps in the zone to the right of the tap zone boundary 424, the viewing user interface 402 may automatically transition to a next or later content item in the collection.

In some examples, the content zone in which the third-party content item 404 is presented may thus include both the extended interaction zone 412 and the navigation zones. The navigation zones may exclude the extended interaction zone 412, e.g., to enable the viewing user to tap a context card 414 or one of the actions 416 to select a desired context element or action, instead of navigating to another item in a content collection. In other words, the navigation zones do not overlap with the extended interaction zone 412 or with the regular interaction zone 406. In some examples, a press and hold operation, directed at the content zone (but outside of the extended interaction zone 412) allows the viewing user to pause presentation of the collection such that the current item remains presented.

FIG. 5 is a user interface diagram depicting a reply user interface in the example form of a reply camera user interface 502, according to some examples, that may be presented by an interaction client 104 executing on a mobile device 114. While the reply camera user interface 502 is described as being presented on the screen of a mobile device 114, the reply camera user interface 502 may also be presented on other suitable devices, as mentioned above with reference to FIG. 4.

In response to the viewing user performing a predefined gesture or making a predefined selection while in the viewing state shown in FIG. 4, the interaction client 104 may automatically transition from the viewing state to an interaction state, e.g., as shown in FIG. 5. In an interaction state, the viewing user may interact with the third-party content item 404 or the sharing user, e.g., by generating a reply message using the reply camera user interface 502, or by utilizing an augmentation applied to the third-party content item 404 to create new content. The predefined selection may be a selection of the camera button 408. The predefined gesture may be a swiping gesture, e.g., a swipe up gesture directed at the regular interaction zone 406 or the extended interaction zone 412, or both, may cause the interaction client 104 to transition to the interaction state.

The reply camera user interface 502 may present a real-time feed from a camera of the mobile device 114, which the user can then capture as a still digital image or a digital video by selecting an appropriate button within an interaction zone 506 of the reply camera user interface 502, e.g., a capture button 508. In some examples, the user may be enabled to select a content item from a media library or other storage, e.g., by selecting a media library selector 510 presented in the reply camera user interface 502.

The reply camera user interface 502 displays a user input content item 504, such as a digital image or digital video captured by the camera of the mobile device 114 or a digital image or digital video retried from storage. The user input content item 504 may be edited or augmented within the reply camera user interface 502 such that the final user input content item 504 comprises desired image data, video data, audio data, text, or a combination of these data types, together with augmentation or modification data (e.g., stickers, filters or lenses).

The interaction zone 506 of the reply camera user interface 502 also includes a function or tools section, in the example form of a function carousel 512. The function carousel 512 presents various tools and functions that may be invoked by a user of the mobile device 114 to interact with other users of the interaction system 100, to interact with content made accessible via the interaction system 100, and also to modify a captured user input content item 504 displayed within the reply camera user interface 502. For example, the function carousel 512 includes a content augmentation selection graphical element 514 (e.g., a user-selectable icon) that is user-selectable to invoke an augmentation function from a collection of augmentation functions. A selected augmentation function may then operate to augment or modify the user input content item 504.

The viewing user may therefore interact further with the third-party content item 404 or the third-party user, e.g., by sharing a response to the third-party content item 404 within the interaction system 100, including the user input content item 504.

Figure 6:
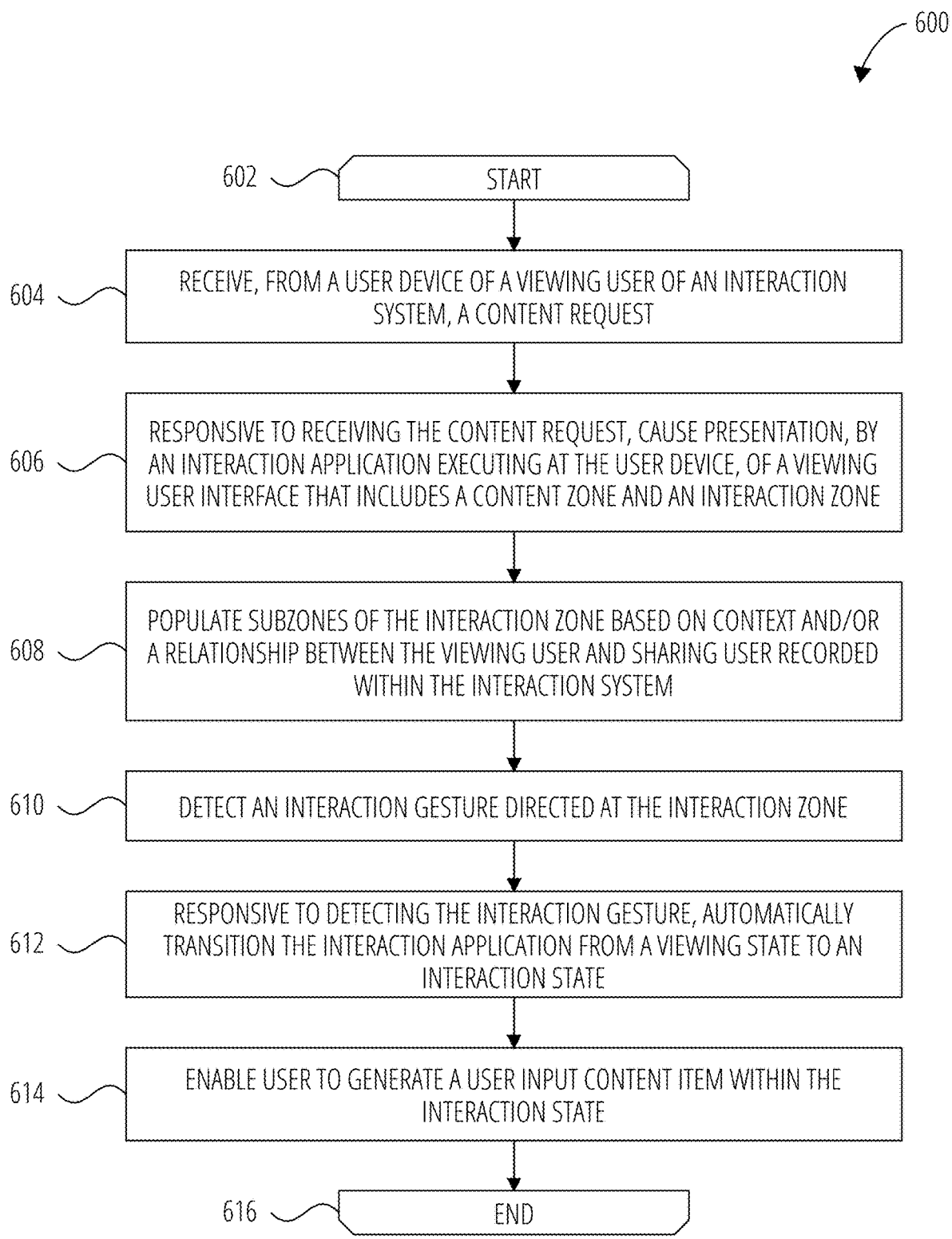
FIG. 6 is a flowchart illustrating a method to provide a user interface with multiple interaction zones, according to some examples.

FIG. 6 is a flowchart illustrating a method 600 to provide a user interface with multiple interaction zones on an interaction application, according to some examples. The method 600 may be performed using various components of the interaction system 100, such as the communication system 208 or the collection management system 224. User interfaces may be presented on a screen of the mobile device 114 or via other suitable devices.

The method 600 commences at opening loop element 602 and progresses to operation 604, where the communication system 208 receives, from a user device of a viewing user of the interaction system 100, a content request. As alluded to above, the content request may include a selection of a content collection within the interaction system 100 which the viewing user wishes to view or interact with. In such cases, the third-party content item displayed in response to the content request may be a first user input content item in a collection of user input content items, with the collection being configured to present the user input content items one after another within the viewing interface, each for a predetermined period of time (unless paused or manually progressed). In other cases, the content request may be a request to view another type of user input content (not a collection), such as a content feed, e.g., a content feed curated for the viewing user by the interaction system 100.

At operation 606, responsive to receiving the content request, the interaction system 100 (e.g., using the collection management system 224 and the communication system 208) causes presentation, by an interaction application executing at the user device, of a viewing user interface that includes a content zone and an interaction zone. As mentioned, the interaction zone may include an extended interaction zone, while the content zone may include the third-party content item.

According to some examples, and as shown at operation 608, the method 600 includes populating, by the interaction system 100, the interaction zone based on context and/or based on a relationship between the viewing user and the sharing user. For example, and as described further below, the regular interaction zone may be populated with reply elements if a predefined relationship, such as a bidirectional relationship, between the two users has been recorded within the interaction system 100, while an alternative interaction element may be presented where no such predefined relationship exists. The extended interaction zone may be populated based on context, e.g., if an augmentation is applied to the third-party content item, an augmentation identifier may be rendered within the extended interaction zone.

At operation 610, the interaction client 104 detects an interaction gesture directed at the interaction zone. For example, the viewing user may perform a swipe up gesture across both the regular and the extended interaction zones. Responsive to the detection of the interaction gesture, the interaction application automatically transitions from a viewing state to an interaction state at operation 612.

At operation 614, the user may generate a user input content item within the interaction state. As mentioned above, the interaction state may be a reply state in which a reply user interface is presented, a content creation state in which the viewing user can create a new user input content item based on a context of the third-party content item, or an alternative interaction state, such as a "read more" state involving presentation of an interface with further information regarding the third-party content item. The method 600 concludes at closing loop element 616.

To illustrate certain examples of the present disclosure, various user interface diagrams are shown in FIG. 7 to FIG. 18. These interfaces may be presented by an interaction client 104 executing on a mobile device 114, or using other types of devices that can provide suitable user interfaces, e.g., the optical display of a head-wearable apparatus 116, a desktop computer, or smart contact lenses.

Figure 7:
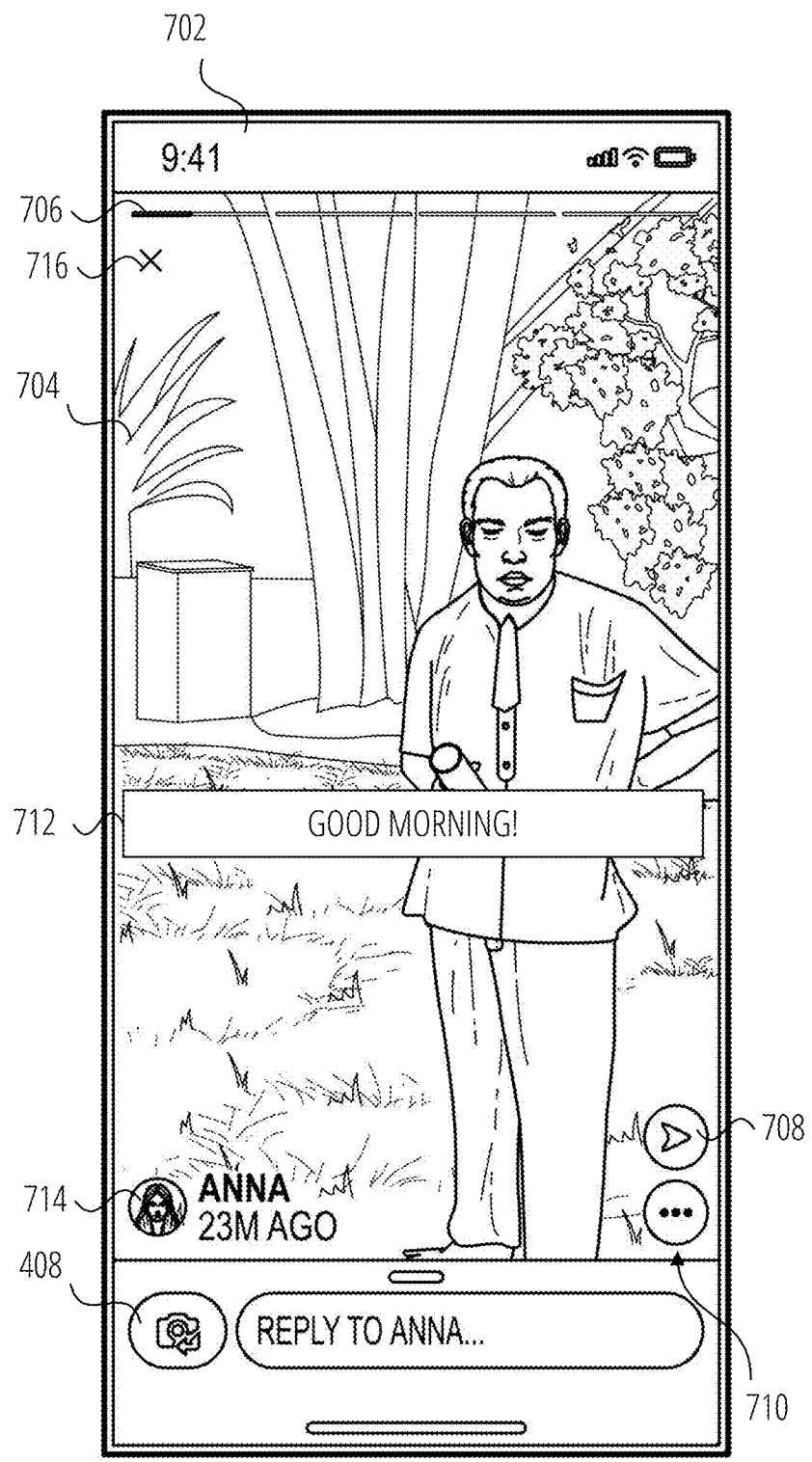
FIG. 7 is a user interface diagram illustrating a viewing user interface, according to some examples.

FIG. 7 is a user interface diagram illustrating a viewing user interface 702, according to some examples. An active user (viewing user) of the interaction client 104 is presented with a user input content item in the form of a third-party content item 704 that is part of a set or collection of third-party content items, as indicated by a progress bar 706 overlaid on the third-party content item 704 at the top of the viewing user interface 702. The third-party content item 704 is in the form of an image that has a media overlay 712 applied thereto. A close button 716, located below the progress bar 706, is user-selectable to close the third-party content item 704 and stop presentation of the content collection.

A camera button 408 positioned in a first interaction subzone, below the third-party content item 704, is user selectable to invoke a modular reply camera, which causes the presentation of a reply interface such as the reply camera user interface 502 of FIG. 5. As described above, the modular reply camera allows the active user to generate a user input content item by taking a picture (e.g., using a front-facing camera of a mobile device 114 hosting the interaction client 104) and sending that picture to a third-party user (e.g., a poster) of the third-party content item 704.

The publishing third-party user (e.g., the poster or sharing user) is identified by contextual information comprising a context element, in the example form of a poster identifier 714, located at the bottom left of the viewing user interface 702. The poster identifier 714 is located in a second, or extended, interaction zone together with stacked actions 710 for various actions enabled by the viewing user interface 702 displayed at the bottom right of the viewing user interface 702. The stacked actions 710 include a share button 708 that is user-selectable to invoke a sharing function of the interaction client 104, allowing the viewing user to share the third-party content item 704 with other users of the interaction system 100, or to a third-party platform.

Figure 8:
FIG. 8 is a user interface diagram illustrating a viewing user interface, according to some examples.

FIG. 8 is a user interface diagram illustrating a viewing user interface 802, according to some examples. The viewing user interface 802 presents a third-party content item 804 in the form of an image that includes a media overlay 806. Within the extended interaction zone, a poster identifier 808 and stacked actions 810 are similarly located to the viewing user interface 702 of FIG. 7. The poster identifier 808 is user-selectable to enable the viewing user to view a user profile of the poster within the interaction system 100.

The stacked actions 810 include a relationship request element in the example form of a subscribe button 812 that is user-selectable to initiate, by the viewing user, establishment of a relationship with the poster in the context of the interaction system 100. The relationship may be a one-directional relationship in terms of which the viewing user subscribes to, or follows, content shared by the poster, but not vice versa.

In the viewing user interface 702 of FIG. 7, the interaction system 100 detects that the viewing user and the poster have a bidirectional relationship (e.g., "friend" relationship) recorded in the interaction system 100 and thus populates the first interaction subzone with reply elements, such as the camera button 408. In the viewing user interface 802 of FIG. 8, the interaction system 100 detects that the viewing user and the poster do not have a bidirectional relationship and thus renders the interaction element in the first interaction subzone as an alternative interaction element.

In FIG. 8, the alternative interaction element is in the form of a use filter button 814 that is linked to a primary context of the third-party content item 804. The interaction system 100 identifies the primary context third-party content item 804 as being a specific augmentation (e.g., "filter") applied to the third-party content item 804, and thus renders the use filter button 814. The use filter button 814 is user-selectable to cause a transition to an interaction state in which the viewing user can create a new user input content item to which the specific augmentation is applied. For example, the specific augmentation may be preselected in a camera interface similar to the reply camera user interface 502. The specific augmentation is identified by an icon next to the words "USE FILTER" within the use filter button 814.

Accordingly, in some examples, where an augmentation is applied to the third-party content item, the alternative interaction element presented in the viewing user interface may include a visual identifier of the augmentation, and can be selected to generate a user input content item including that augmentation. Other examples of alternative interaction elements are described below.

Figure 9:
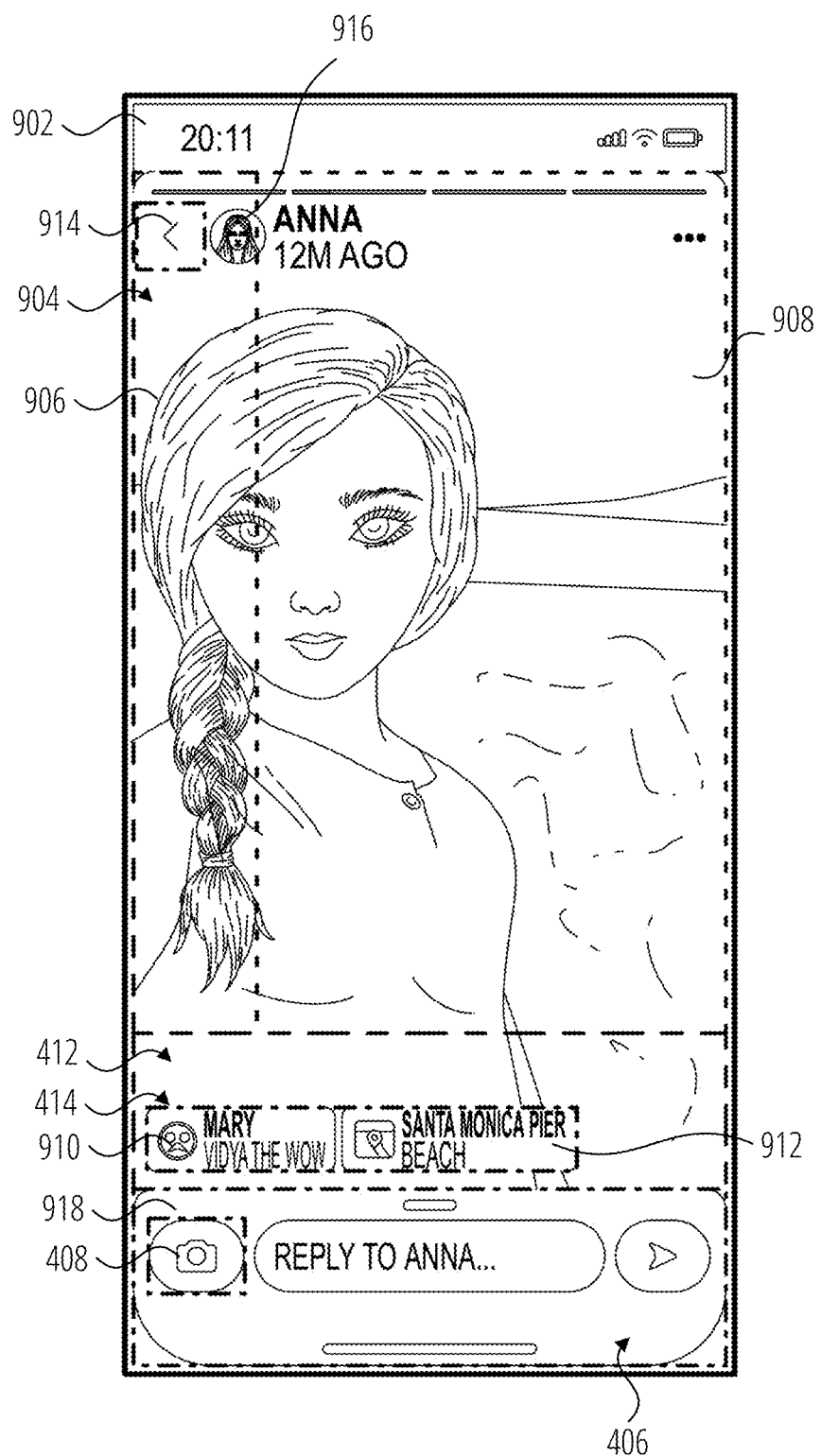
FIG. 9 is a user interface diagram illustrating a viewing user interface, according to some examples.

FIG. 9 is a user interface diagram illustrating a viewing user interface 902, according to some examples. The viewing user interface 902 presents a third-party content item 904 in the form of a video captured by a poster. FIG. 9 illustrates various zones within the viewing user interface 902, including the regular interaction zone 406 which includes the camera button 408, and the extended interaction zone 412 which includes context elements, as described with reference to FIG. 4. An active viewing user may interact with each of these zones to perform various functions and activate various interactions.

In FIG. 9, an augmentation identifier 910 and location identifier 912 are shown as exemplary context elements overlaid on the third-party content item 904. Specifically, the augmentation identifier 910 is a context card identifying a lens applied to the third-party content item 904 and the location identifier 912 is a location context card identifying a location of capture of the third-party content item 904. These cards are presented as "pinned" at the top of an interaction tray 918 (in the interaction zone 406) to provide an extended interaction zone 412 within the viewing user interface 902.

The third-party content item 904 defines a content zone within the viewing user interface 902 and, as mentioned, the extended interaction zone 412 is arranged within the content zone. Above the extended interaction zone 412, the content zone defines a left navigation zone 906 and a right navigation zone 908. The left navigation zone 906 and the right navigation zone 908 can be tapped by the viewing user to navigate back or forward within the content collection, respectively. The content zone further includes a poster identifier 916 which, in FIG. 9, is not located within the extended interaction zone 412 and is instead presented at the top of the viewing user interface 902. A back button 914 is presented next to the poster identifier 916, allowing the viewing user to exit the content collection.

In some examples, the viewing user interface 902 as presented in FIG. 9 is presented where the two users have a predefined relationship within the interaction system 100 (e.g., a bidirectional relationship recorded in the entity table 308 and/or entity graph 310). An interaction zone mapping is modified to provide an extended interaction zone 412 above the interaction tray 918 and a regular interaction zone 406. When a user taps on a context card 414 within the extended interaction zone 412, the associated item (e.g., an augmentation or map) is invoked and caused to be displayed. For example, tapping the augmentation identifier 910 may open a camera interface with the relevant augmentation preselected, while tapping the location identifier 912 may open a map interface showing the relevant location.

Swipes within the interaction zone (e.g., within the interaction zone 406 or the extended interaction zone 412) invoke a transition to the interaction state. For example, a swipe up may invoke the reply camera function, which then causes the generation and presentation of the reply camera user interface 502.

In certain situations, e.g., where the active viewing user has not established a bidirectional relationship (e.g., a friend relationship) with the third-party publishing user, the interaction tray 918 may not be presented within the viewing user interface 902, or may be presented in an empty state with a reduced size. In such cases, context cards 414 may be moved down to the bottom of a media viewport (e.g., within which the third-party content item 904 is displayed).

Figure 10:
FIG. 10 is a user interface diagram illustrating a viewing user interface, according to some examples.
Figure 11:
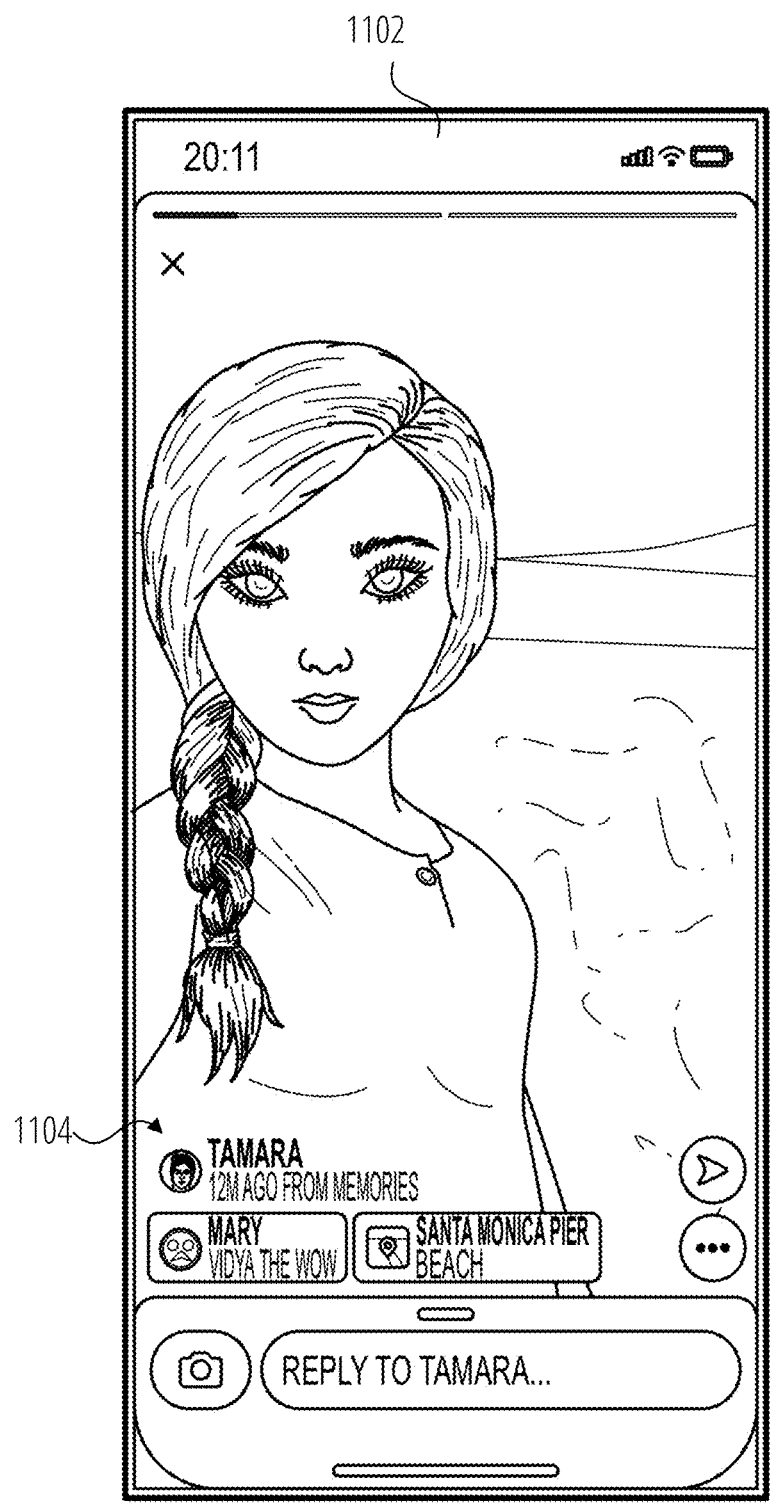
FIG. 11 is a user interface diagram illustrating a viewing user interface, according to some examples.

FIG. 10 and FIG. 11 are user interface diagrams showing a viewing user interface 1002 and a viewing user interface 1102, respectively, according to some examples. The examples shown in FIG. 10 and FIG. 11 are presented when a bidirectional relationship (e.g., a friend relationship) is recorded within the interaction system 100 between an active viewing user and a third-party sharing user, and the active viewing user is viewing third-party content of the publishing user on the interaction client 104.

In FIG. 10, the context element 1004 shown is a poster identifier that includes additional context information regarding the content item shared by the poster. In FIG. 10, this context element 1004 indicates when the item was posted and where it originated from (a "Memories" section of the interaction client 104).

In FIG. 11, three context elements 1104 are included in the extended interaction zone, e.g., pinned to a top of a reply tray. These elements include a poster identifier as in FIG. 10 that is positioned above two further context cards: an augmentation identifier and a location identifier.

It is noted that certain context information (e.g., location information for the third-party content item) is selectively made available and published in the extended interaction zone using context elements by the interaction system 100, based on an active viewing user having established a relationship recorded within the interaction system 100 (e.g., as recorded in the entity table 308). Other context information of a non-confidential or non-sensitive nature, such as the identity of the augmentation applied to the third-party content item, may be presented by way of a context card, regardless of whether a bidirectional relationship is established within the interaction system 100 between the active user and the third-party publishing user.

Figure 12:
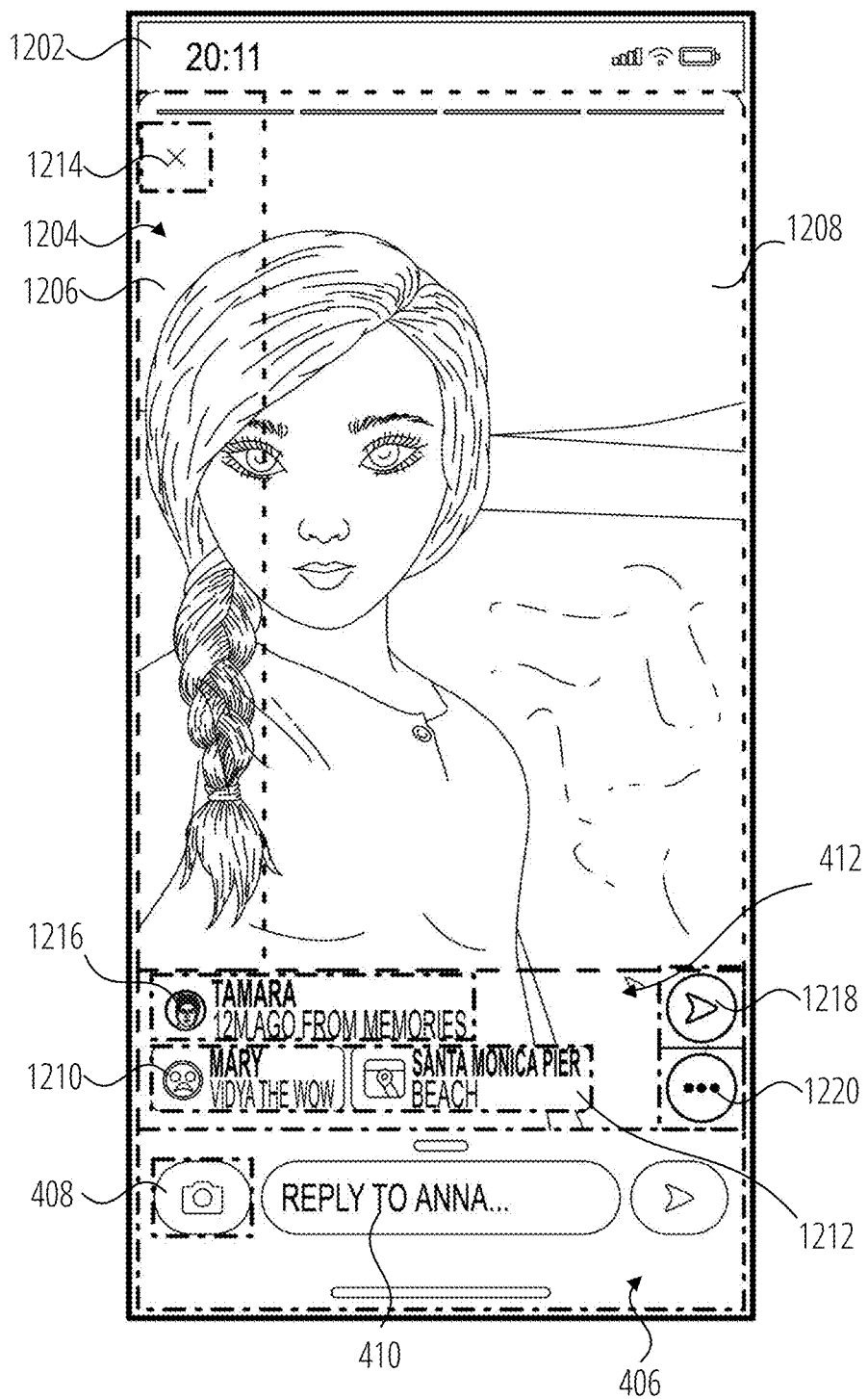
FIG. 12 is a user interface diagram illustrating a viewing user interface, according to some examples.

FIG. 12 is a user interface diagram illustrating a viewing user interface 1202, according to some examples. The viewing user interface 1202 presents a third-party content item 1204 in the form of a video captured by a poster. FIG. 12 illustrates various zones within the viewing user interface 1202, including the regular interaction zone 406 which includes the camera button 408, and the extended interaction zone 412 which includes user-selectable context elements and action elements, as described with reference to FIG. 4.

In FIG. 12, an augmentation identifier 1210 and location identifier 1212 are shown as exemplary context elements overlaid on the third-party content item 1204. The viewing user interface 1202 differs from the viewing user interface 902 in that the poster identifier 1216 is also shown as a context element within the extended interaction zone 412. This may enhance the feed-like experience of the viewing user interface 1202, or visual appeal thereof, by opening up a top region of the content. Further, a send button 1218 and an overflow actions button 1220 are presented in a stacked arrangement within the extended interaction zone 412. These elements within the extended interaction zone 412 can be selected by a tapping gesture to invoke presentation of additional information, e.g., the poster identifier 1216 can be selected to invoke presentation of a user profile of the poster.

The third-party content item 1204 defines a content zone within the viewing user interface 1202 and, as mentioned, the extended interaction zone 412 is arranged within the content zone. Above the extended interaction zone 412, the content zone defines a left navigation zone 1206 and a right navigation zone 1208, as described above. A back button 1214 is presented in a top left corner of the content zone, allowing the viewing user to exit the content collection.

In some examples, the viewing user interface 1202 as presented in FIG. 12 is presented where the two users have a bidirectional relationship within the interaction system 100. Where the two users do not have a bidirectional relationship, the reply elements, such as the camera button 408 and text input field 410, may not be included in the regular interaction zone 406, preventing a viewing user from replying directly to a poster. Accordingly, while selection of an interaction element (such as the camera button 408) in the viewing user interface 1202 invokes an interaction state in the form of a reply state, such a state may not be available where no bidirectional relationship (or other relationship, depending on the implementation) exists. Further, certain confidential or sensitive information may not be included as context cards within the extended interaction zone 412.

Returning to FIG. 12, swipes within the interaction zone (e.g., within the interaction zone 406 or the extended interaction zone 412) invoke a transition to the interaction state. For example, a swipe up may invoke the reply camera function, which then causes the generation and presentation of the reply camera user interface 502. Accordingly, while each element in the interaction zone 406 and in the extended interaction zone 412 can be individually selected by tapping on the relevant element, a swipe gesture across or along an element within the interaction zone 406 or extended interaction zone 412 does not select the individual element, but instead invokes the transition to the interaction state.

Figure 13:
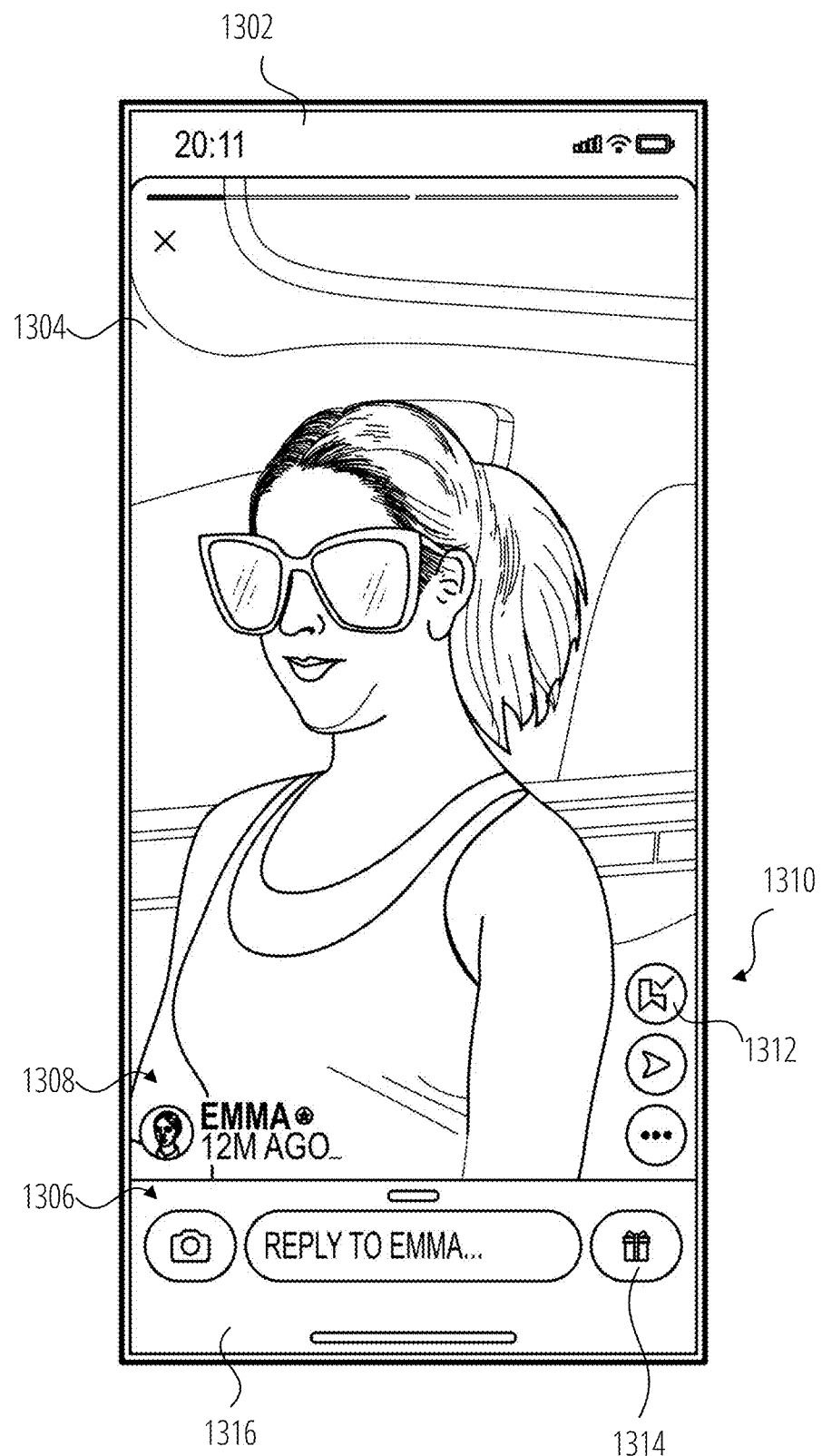
FIG. 13 is a user interface diagram illustrating a viewing user interface, according to some examples.
Figure 14:
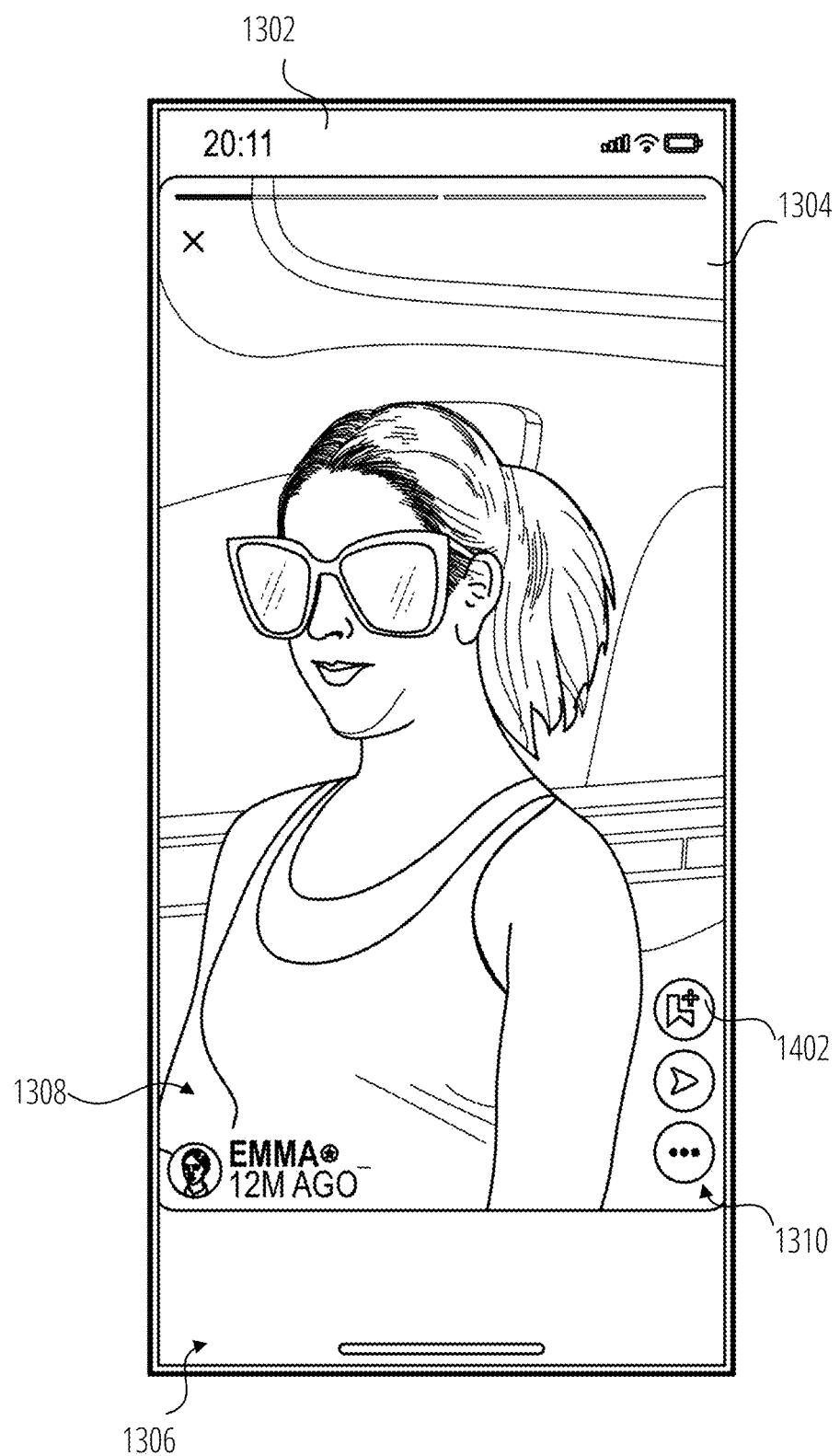
FIG. 14 is a user interface diagram illustrating a viewing user interface, according to some examples.

FIG. 13 and FIG. 14 are user interface diagrams illustrating two versions of a viewing user interface 1302, showing the manner in which the interaction system 100 may automatically populate the viewing user interface 1302 differently based on a relationship between the viewing user and the sharing user, or poster, according to some examples.

Each viewing user interface 1302 presents a third-party content item 1304, and includes a first interaction subzone 1306 (e.g., a regular interaction zone) and a second interaction subzone 1308 (e.g., extended interaction zone), the latter being overlaid on the third-party content item 1304. In FIG. 13, a predefined relationship in the example form of a one-directional relationship is recorded between the viewing user and the poster (e.g., in the entity table 308 and entity graph 310). Specifically, the viewing user has "subscribed" to, or "followed," the account of the poster within the interaction system 100. This is visually indicated by a check mark within the subscribe button 1312 which forms part of a set of stacked actions 1310 in the second interaction subzone 1308.

Based on the existence of the predefined relationship, the interaction system 100 populates the viewing user interface 1302 as shown in FIG. 13. Specifically, the first interaction subzone 1306 includes a set of interaction elements in the form of reply elements. The reply elements enable the viewing user to submit various types of replies to the poster via the interaction client 104, e.g., capture an image and send the image to the poster, send a text reply, or send an electronic "gift" by selecting the gifting actions button 1314. These reply elements are presented on an interaction tray in the example form of a reply tray 1316 within the first interaction subzone 1306.

In FIG. 14, the viewing user is not subscribed to the account of the poster, and no relationship (one-directional or bidirectional) between the users is recorded within the interaction system 100. Accordingly, the presentation of the viewing user interface 1302 is varied. Specifically, the first interaction subzone 1306 is rendered in an empty state (as opposed to FIG. 13 in which the reply tray 1316 is rendered in the first interaction subzone 1306).

In FIG. 14, the second interaction subzone 1308 is presented in substantially the same manner as in FIG. 13. However, the subscribe button 1402 is rendered with a plus sign instead of the check mark. The plus sign indicates, to the viewing user, that the viewing user may choose to subscribe to the posts of the poster by selecting the subscribe button 1402. Furthermore, compared to FIG. 13, the third-party content item 1304 extends further down along the length of the viewing user interface 1302 given the absence of the reply tray 1316, and the context element and stacked actions 1310 are shifted down accordingly.

In other words, if the viewing user is not subscribed to digital media content published by the third-party publishing user, the subscribe button 1402 is shown in an "unsubscribed" or "invitation to subscribe" state (e.g., by displaying the plus sign). Thus, where the viewing user has not subscribed to the posts of the poster, the viewing user interface 1302 may present a more limited set of interaction options.

Figure 15:
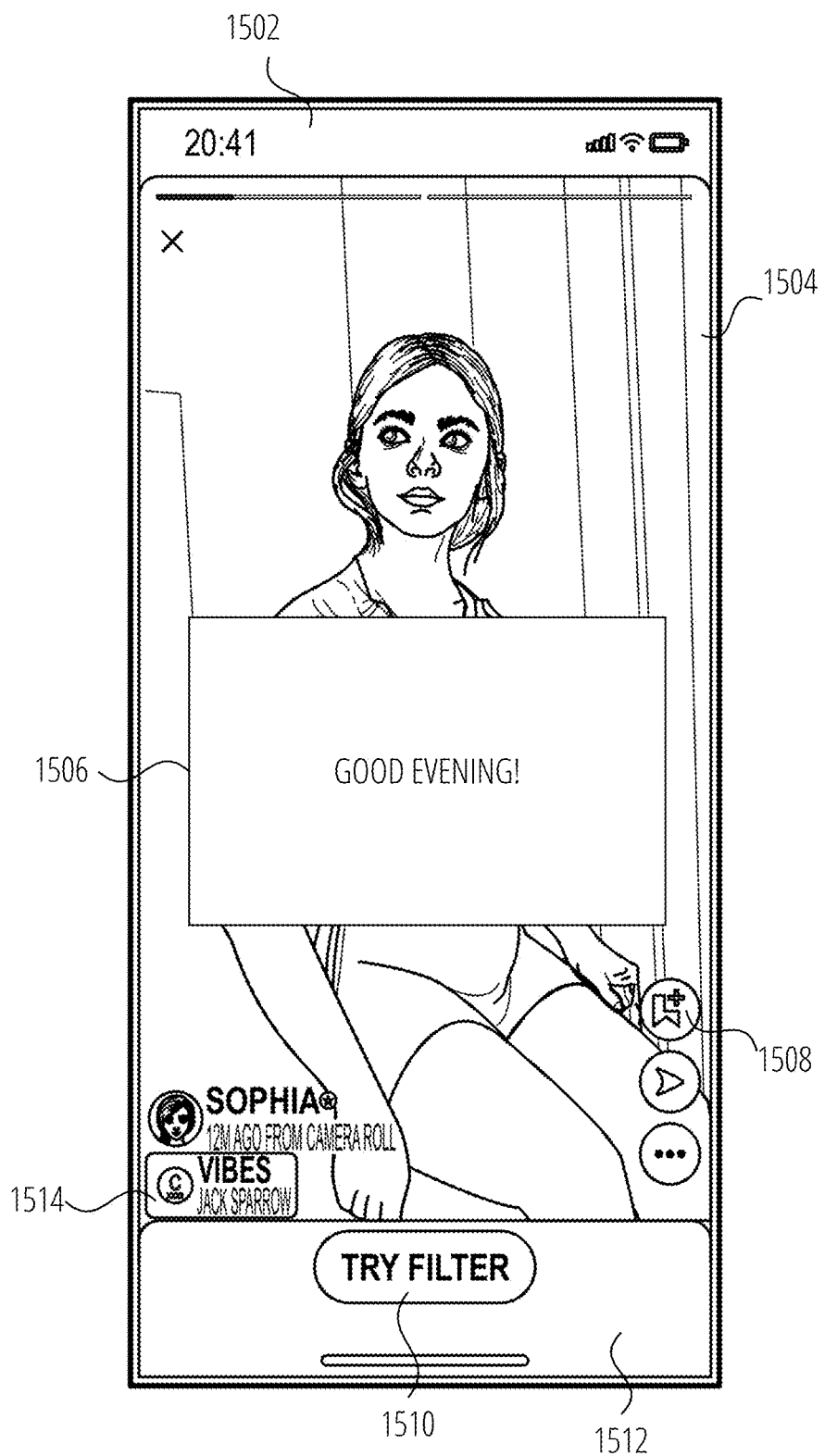
FIG. 15 is a user interface diagram illustrating a viewing user interface, according to some examples.
Figure 16:
FIG. 16 is a user interface diagram illustrating a viewing user interface, according to some examples.

FIG. 15 and FIG. 16 are user interface diagrams illustrating two versions of a viewing user interface 1502, showing the manner in which the interaction system 100 may automatically populate the viewing user interface 1502 differently based on a relationship between the viewing user and the sharing user, or poster, according to some examples. FIG. 15 also illustrates context-based interaction zone population, according to some examples.

The viewing user interface 1502 includes a third-party content item 1504 with a media overlay 1506 applied thereto. A viewing user views the third-party content item 1504 using the interaction client 104. In FIG. 15, the viewing user does not have an established relationship with the poster recorded within the interaction system 100. Specifically, the viewing user has not subscribed to the posts of the poster. The interaction client 104 renders the subscribe button 1508 with a plus sign instead of a check mark. The plus sign indicates, to the viewing user, that the viewing user may choose to subscribe to the posts of the poster by selecting the subscribe button 1508.

Still referring to FIG. 15, the viewing user interface 1502 includes an interaction tray 1512 displaying an alternative interaction element in the example form of a try filter button 1510. The interaction tray 1512 is located in the regular interaction zone, also referred to as the first interaction subzone. Given that the two users do not have an established relationship, the interaction tray 1512 does not include any reply elements, but is instead populated by the interaction client 104 with the try filter button 1510, which may be regarded as a "call to action," or CTA, element.

The CTA element is determined by the interaction system 100 based on a primary context of the third-party content item 1504. In FIG. 15, the third-party content item 1504 includes an augmentation (e.g., the media overlay 1506) and this augmentation is identified by a context element in the form of an augmentation identifier 1514 in the extended interaction zone, or second interaction subzone. Thus, user selection of the try filter button 1510 invokes an interaction state in which the viewing user can generate a new user input content item to which the augmentation (e.g., the media overlay 1506) is applied.

In some examples, the interaction system 100 may therefore determine a primary context associated with a content item being presented, and may link an interaction element in the interaction zone to the primary context such that user selection of the interaction element invokes a function associated with the primary context within the interaction application. The primary context may be determined based on, or may mirror, a context element within the extended interaction zone.

Various techniques may be used to determine context. In some examples, metadata of content items may be analyzed to determine context, e.g., time, location, publisher, or the like. In other examples, augmentations may be analyzed. Where several contexts are identified, the interaction system 100 may rank them, e.g., using a predefined ranking methodology. In some examples, the interaction system 100 may analyze a video or image and determine one or more features associated with the video or image. The one or more features may include color, texture, shape, or other characteristics that may be indicative of, for example, an augmentation used. The determined features can be compared with a set of known features, e.g., to identify an augmentation. A comparison of features may be performed using machine learning techniques, such as a convolutional neural network (CNN). In the case of augmentations, the CNN may be trained on a dataset of videos or images that have been labeled with the augmentations used, and may learn to associate certain features with each filter. The CNN may then be used to predict the augmentation used in new videos or images based on their features. Other techniques, such as clustering or decision trees, may also be used to identify the augmentation used based on the determined features.

Referring specifically to FIG. 15, the interaction tray 1512 may first be presented in an empty state (with no selectable elements) and the interaction client 104 may cause a gradual transition to a populated state in which the try filter button 1510 is shown, e.g., in response to the viewing user viewing the specific third-party content item 1504 without progressing or exiting for a threshold period of time (e.g., 0.5 seconds). An interaction element such as the try filter button 1510 may thus be rendered within the viewing user interface by invoking an animation function of the interaction application to transition the first interaction subzone from an empty state to a populated state.

Turning now to FIG. 16, in the viewing user interface 1502 of FIG. 16, the presented elements are modified in response to the viewing user subscribing to the posts of the poster. A subscription confirmation tooltip 1602 is displayed to confirm a subscription based on user selection of the subscribe button 1508 in FIG. 15. The subscribe button 1604 is also modified to include a check mark indicating a subscribe state of the viewing user with respect to the third-party publishing user.

The viewing user interface 1502 of FIG. 16 also includes a notification banner 1606 overlaid on the upper area of the third-party content item 1504, with a selector 1608 to enable notifications regarding posts or publications by the third-party publishing user.

Based on the existence of the predefined relationship (e.g., a one-directional "subscribed" relationship), the interaction system 100 populates the regular interaction zone of the viewing user interface 1502 as shown in FIG. 16. Specifically, the regular interaction zone includes an interaction tray 1610 with a set of reply elements 1612. The reply elements 1612 enable the viewing user to submit various types of replies to the poster via the interaction client 104, e.g., capture an image and send the image to the poster, send a text reply, or send an electronic "gift." Further, a reply with filter button 1614 allows the viewing user to initiate a transition to a reply state (e.g., as shown in FIG. 5), in which the viewing user can capture a new user input content item to which the media overlay 1506 is automatically applied.

Figure 17:
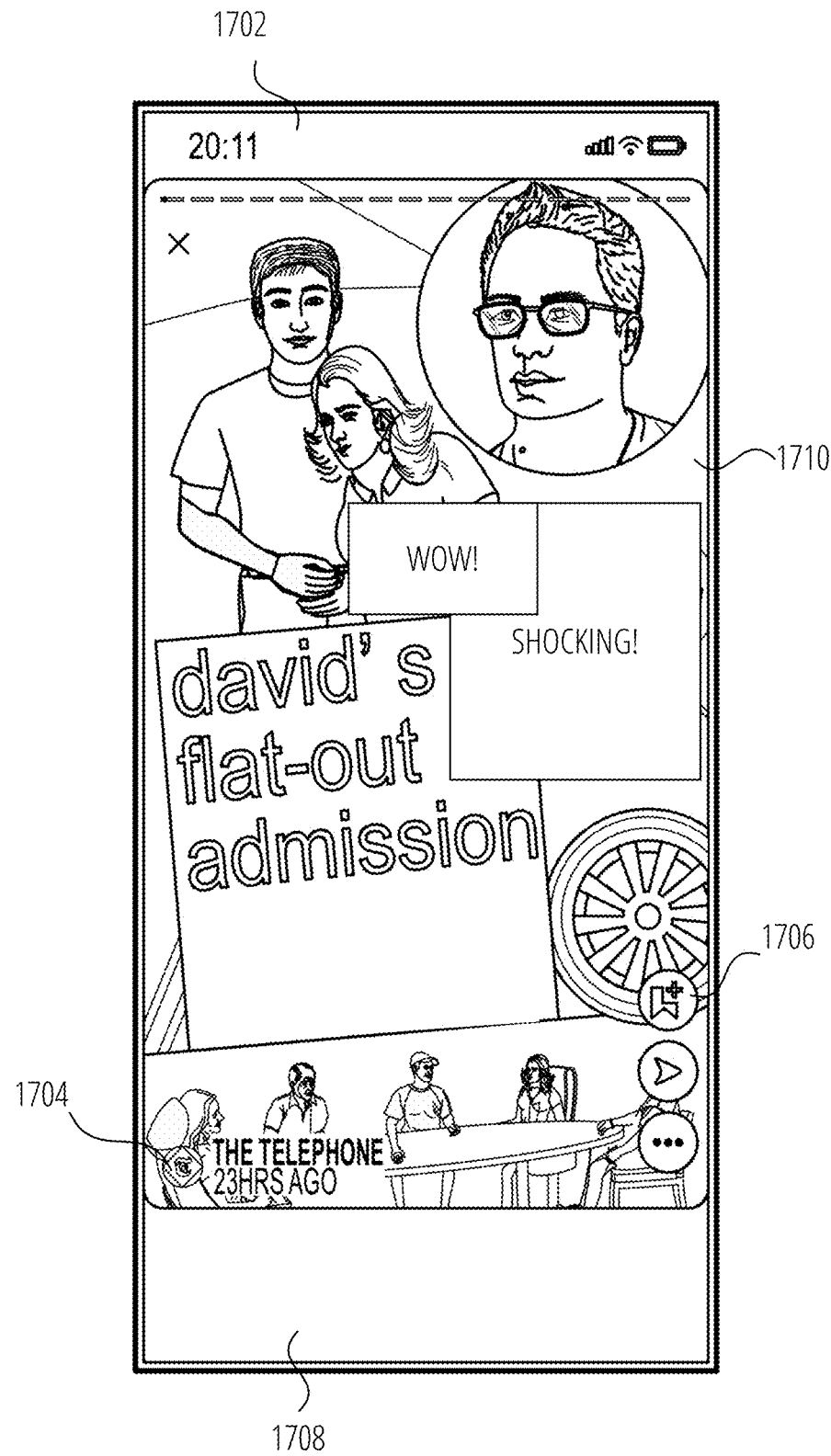
FIG. 17 is a user interface diagram illustrating a viewing user interface, according to some examples.
Figure 18:
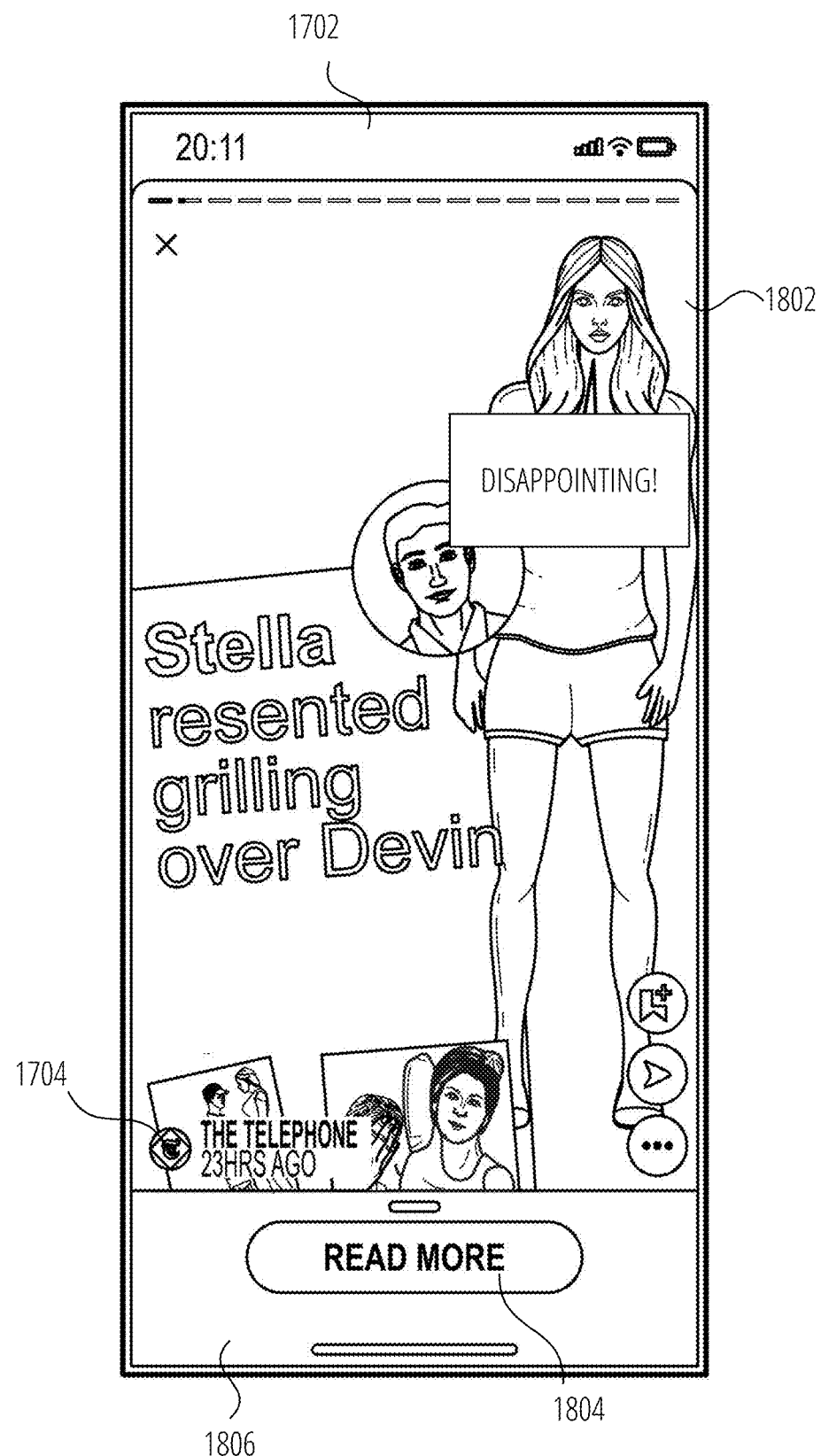
FIG. 18 is a user interface diagram illustrating a viewing user interface, according to some examples.

FIG. 17 and FIG. 18 are further user interface diagrams illustrating context-based user interface rendering, according to some examples. In FIG. 17 and FIG. 18, the viewing user is viewing a content collection of a third-party user via the interaction client 104. The third-party user is a commercial publishing entity (e.g., "The Telephone"), as identified by the poster identifier 1704.

In these examples, the subscribe button 1706 is shown to indicate that the viewing user is not subscribed to published content of the commercial publishing entity. In some examples, the subscribe button 1706 may be visually highlighted (e.g., through animation or other visual highlighting) when a viewing user "dwells on" the third-party content for a determinable view threshold time (e.g., more than 0.5 seconds without exiting or progressing).

The viewing user interface 1702 includes a placeholder element 1708 which is moveable or expandable up and down, responsive to the content or to user action. In this case, the poster identifier 1704 is shifted to accommodate the placeholder element 1708 and may also shift up and down as the placeholder element 1708 expands and collapses. Initially, the viewing user is viewing a first content item 1710 in the content collection, as shown in FIG. 17, and the placeholder element 1708 is initialized by the interaction client 104 in an empty state.

The viewing user then navigates to a second content item 1802, as shown in FIG. 18, e.g., by tapping in a right navigation zone of the viewing user interface 1702, above the extended interaction zone. If the viewing user "dwells" on the second content item 1802 for more than a predefined period of time (e.g., more than 0.5 seconds), the interaction client 104 may initiate a transition to display a CTA element based on the primary context of the second content item 1802. Specifically, the viewing user interface 1702 may transition the placeholder element 1708 to an interaction tray 1806.

In FIG. 18, the primary context is determined to be that the second content item 1802 relates to a published article associated with an accessible link. The interaction system 100 may analyze metadata associated with the second content item 1802, e.g., a link associated therewith, to determine the context. An interaction element, such as the read more button 1804, may be rendered within the viewing user interface 1702 by invoking an animation function of the interaction application to transition the placeholder element 1708 in the interaction zone from an empty state to a populated state so as to define the interaction tray 1806. The read more button 1804 is user-selectable to access the published article, allowing the user to interact further with the primary context of the second content item 1802.

It is noted that user interfaces may, in some examples, be rendered with a "squared off" style, e.g., as shown with respect to the lower sections of the viewing user interfaces in FIG. 4, FIG. 7, FIG. 12, FIG. 13, and FIG. 18, and with respect to the upper sections of the viewing user interfaces in FIG. 4, FIG. 7 and FIG. 8. In such examples, one or more zones, or borders between zones, may define straight lines and rectangular corners, as opposed to rounded corners, which may increase the sense of a "vertical feed" from a user experience perspective.

Data Communications Architecture

Figure 19:
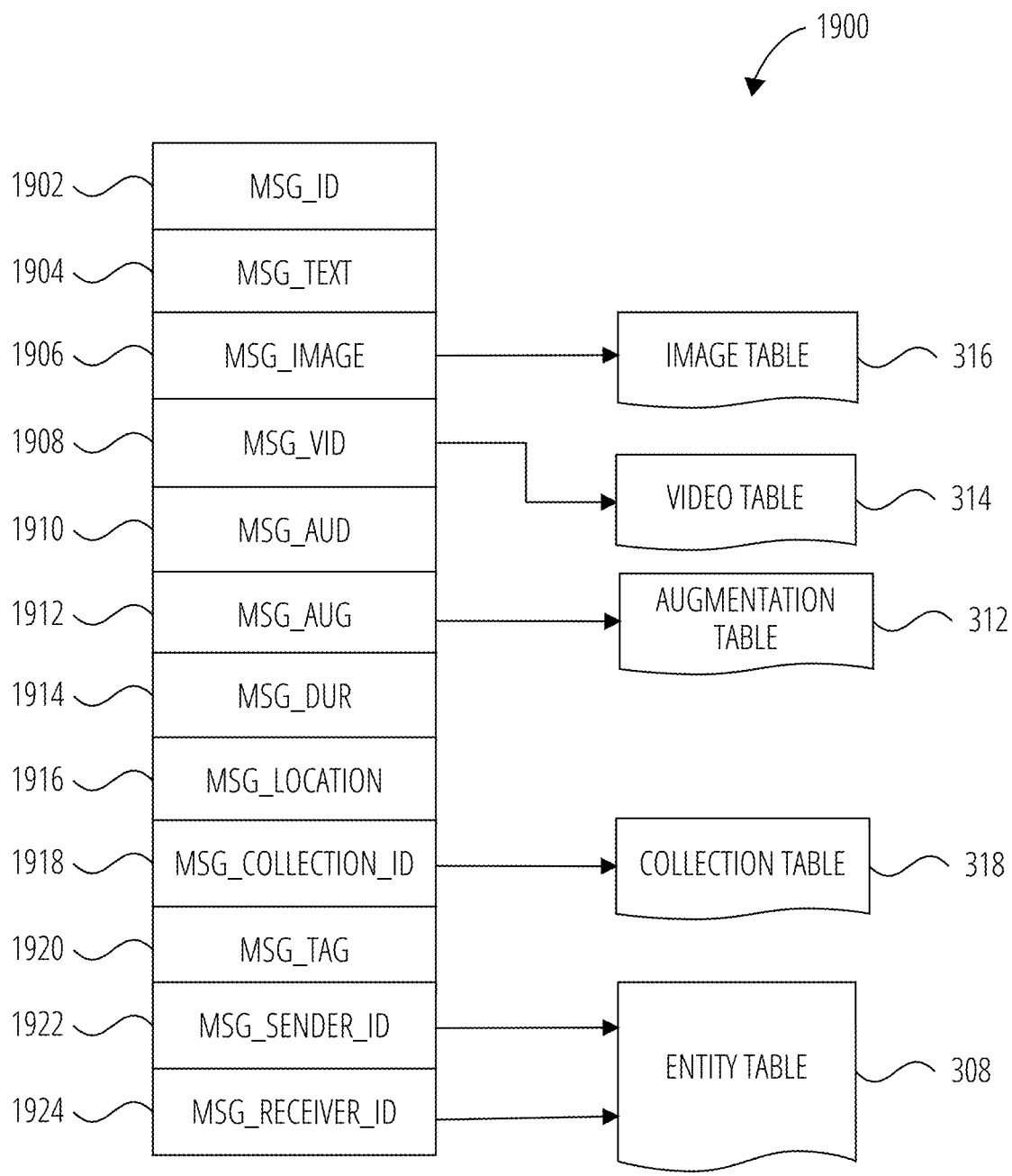
FIG. 19 is a diagrammatic representation of a message, according to some examples.

FIG. 19 is a schematic diagram illustrating a structure of a message 1900, according to some examples, generated by an interaction client 104 for communication to a further interaction client 104 via the interaction servers 124. The content of a particular message 1900 is used to populate the message table 306 stored within the database 304, accessible by the interaction servers 124. Similarly, the content of a message 1900 is stored in memory as "in-transit" or "in-flight" data of the user system 102 or the interaction servers 124. A message 1900 is shown to include the following example components:

- Message identifier 1902: a unique identifier that identifies the message 1900.
- Message text payload 1904: text, to be generated by a user via a user interface of the user system 102, and that is included in the message 1900.
- Message image payload 1906: image data, captured by a camera component of a user system 102 or retrieved from a memory component of a user system 102, and that is included in the message 1900. Image data for a sent or received message 1900 may be stored in the image table 316.
- Message video payload 1908: video data, captured by a camera component or retrieved from a memory component of the user system 102, and that is included in the message 1900. Video data for a sent or received message 1900 may be stored in the video table 314.
- Message audio payload 1910: audio data, captured by a microphone or retrieved from a memory component of the user system 102, and that is included in the message 1900.
- Message augmentation data 1912: augmentation data (e.g., filters, stickers, or other annotations or enhancements) that represents augmentations to be applied to message image payload 1906, message video payload 1908, or message audio payload 1910 of the message 1900. Augmentation data for a sent or received message 1900 may be stored in the augmentation table 312.
- Message duration parameter 1914: parameter value indicating, in seconds, the amount of time for which content of the message (e.g., the message image payload 1906, message video payload 1908, message audio payload 1910) is to be presented or made accessible to a user via the interaction client 104.
- Message geolocation parameter 1916: geolocation data (e.g., latitudinal and longitudinal coordinates) associated with the content payload of the message. Multiple message geolocation parameter 1916 values may be included in the payload, each of these parameter values being associated with respect to content items included in the content (e.g., a specific image within the message image payload 1906, or a specific video in the message video payload 1908).
- Message collection identifier 1918: identifier values identifying one or more content collections (e.g., "stories" identified in the collection table 318) with which a particular content item in the message image payload 1906 of the message 1900 is associated. For example, multiple images within the message image payload 1906 may each be associated with multiple content collections using identifier values.
- Message tag 1920: each message 1900 may be tagged with multiple tags, each of which is indicative of the subject matter of content included in the message payload. For example, where a particular image included in the message image payload 1906 depicts an animal (e.g., a lion), a tag value may be included within the message tag 1920 that is indicative of the relevant animal. Tag values may be generated manually, based on user input, or may be automatically generated using, for example, image recognition.
- Message sender identifier 1922: an identifier (e.g., a messaging system identifier, email address, or device identifier) indicative of a user of the user system 102 on which the message 1900 was generated and from which the message 1900 was sent.
- Message receiver identifier 1924: an identifier (e.g., a messaging system identifier, email address, or device identifier) indicative of a user of the user system 102 to which the message 1900 is addressed.

The contents (e.g., values) of the various components of message 1900 may be pointers to locations in tables within which content data values are stored. For example, an image value in the message image payload 1906 may be a pointer to (or address of) a location within an image table 316. Similarly, values within the message video payload 1908 may point to data stored within a video table 314, values stored within the message augmentation data may point to data stored in an augmentation table 312, values stored within the message collection identifier 1918 may point to data stored in a collection table 318, and values stored within the message sender identifier 1922 and the message receiver identifier 1924 may point to user records stored within an entity table 308.

System with Head-Wearable Apparatus

Figure 20:
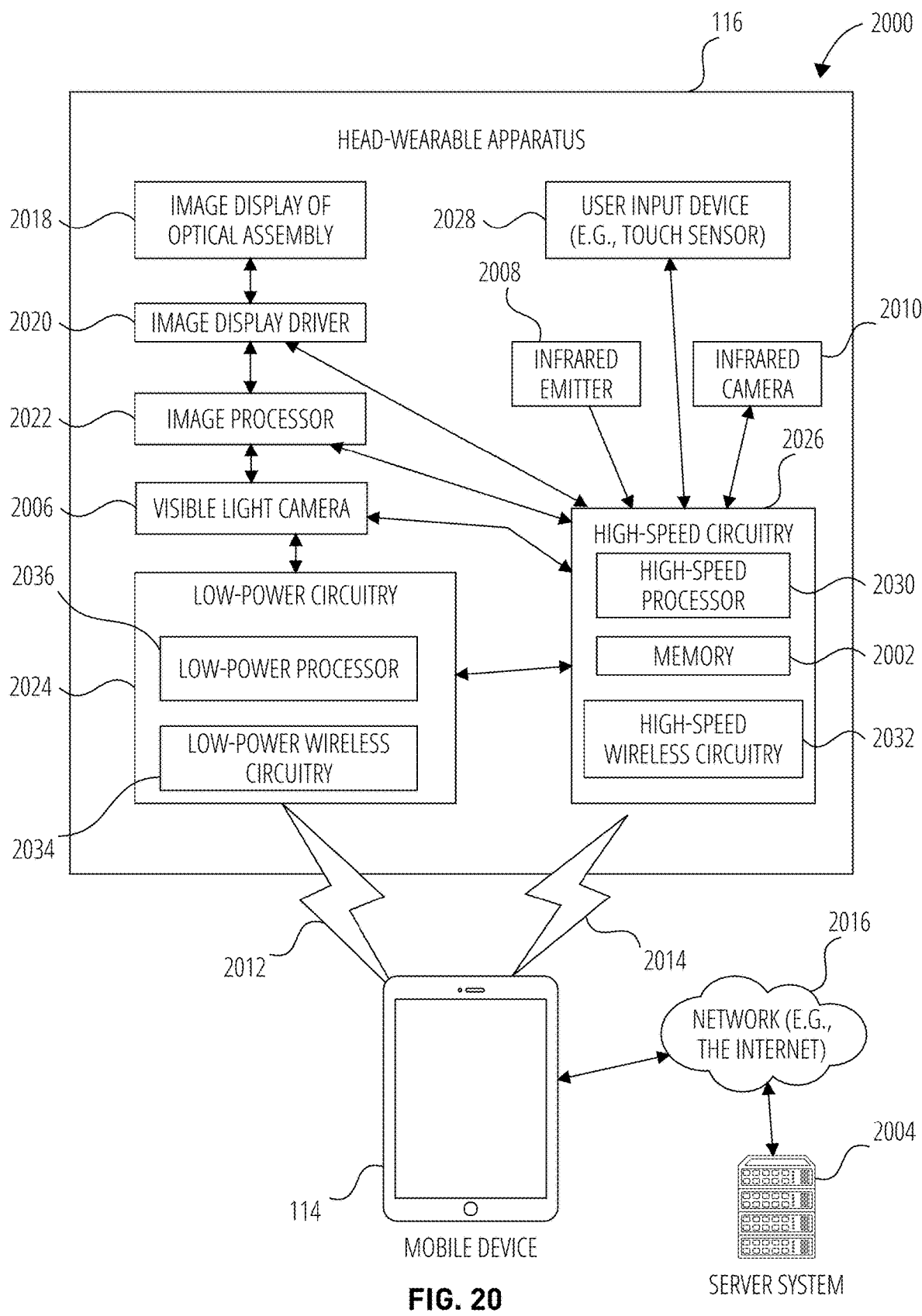
FIG. 20 illustrates a system including a head-wearable apparatus, according to some examples.

FIG. 20 illustrates a system 2000 including a head-wearable apparatus 116 with a selector input device, according to some examples. FIG. 20 is a high-level functional block diagram of an example head-wearable apparatus 116 communicatively coupled to a mobile device 114 and various server systems 2004 (e.g., the interaction server system 110) via various networks 2016.

The head-wearable apparatus 116 includes one or more cameras, each of which may be, for example, a visible light camera 2006, an infrared emitter 2008, and an infrared camera 2010.

The mobile device 114 connects with head-wearable apparatus 116 using both a low-power wireless connection 2012 and a high-speed wireless connection 2014. The mobile device 114 is also connected to the server system 2004 and the network 2016.

The head-wearable apparatus 116 further includes two image displays of the image display of optical assembly 2018. The two image displays of optical assembly 2018 include one associated with the left lateral side and one associated with the right lateral side of the head-wearable apparatus 116. The head-wearable apparatus 116 also includes an image display driver 2020, an image processor 2022, low-power circuitry 2024, and high-speed circuitry 2026. The image display of optical assembly 2018 is for presenting images and videos, including an image that can include a graphical user interface to a user of the head-wearable apparatus 116.

The image display driver 2020 commands and controls the image display of optical assembly 2018. The image display driver 2020 may deliver image data directly to the image display of optical assembly 2018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 2028 (e.g., touch sensor or push button), including an input surface on the head-wearable apparatus 116. The user input device 2028 (e.g., touch sensor or push button) is to receive from the user an input selection to manipulate the graphical user interface of the presented image.

The components shown in FIG. 20 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 2006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 2002, which stores instructions to perform a subset or all of the functions described herein. The memory 2002 can also include a storage device.

As shown in FIG. 20, the high-speed circuitry 2026 includes a high-speed processor 2030, a memory 2002, and high-speed wireless circuitry 2032. In some examples, the image display driver 2020 is coupled to the high-speed circuitry 2026 and operated by the high-speed processor 2030 in order to drive the left and right image displays of the image display of optical assembly 2018. The high-speed processor 2030 may be any processor capable of managing high-speed communications and operation of any general computing system needed for the head-wearable apparatus 116. The high-speed processor 2030 includes processing resources needed for managing high-speed data transfers on a high-speed wireless connection 2014 to a wireless local area network (WLAN) using the high-speed wireless circuitry 2032. In certain examples, the high-speed processor 2030 executes an operating system such as a LINUX operating system or other such operating system of the head-wearable apparatus 116, and the operating system is stored in the memory 2002 for execution. In addition to any other responsibilities, the high-speed processor 2030 executing a software architecture for the head-wearable apparatus 116 is used to manage data transfers with high-speed wireless circuitry 2032. In certain examples, the high-speed wireless circuitry 2032 is configured to implement Institute of Electrical and Electronic Engineers (IEEE) 802.11 communication standards, also referred to herein as WiFi. In some examples, other high-speed communications standards may be implemented by the high-speed wireless circuitry 2032.

The low-power wireless circuitry 2034 and the high-speed wireless circuitry 2032 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 2012 and the high-speed wireless connection 2014, may be implemented using details of the architecture of the head-wearable apparatus 116, as can other elements of the network 2016.

The memory 2002 includes any storage device capable of storing various data and applications, including, among other things, camera data generated by the left and right visible light cameras 2006, the infrared camera 2010, and the image processor 2022, as well as images generated for display by the image display driver 2020 on the image displays of the image display of optical assembly 2018. While the memory 2002 is shown as integrated with high-speed circuitry 2026, in some examples, the memory 2002 may be an independent standalone element of the head-wearable apparatus 116. In certain such examples, electrical routing lines may provide a connection through a chip that includes the high-speed processor 2030 from the image processor 2022 or the low-power processor 2036 to the memory 2002. In some examples, the high-speed processor 2030 may manage addressing of the memory 2002 such that the low-power processor 2036 will boot the high-speed processor 2030 any time that a read or write operation involving memory 2002 is needed.

As shown in FIG. 20, the low-power processor 2036 or high-speed processor 2030 of the head-wearable apparatus 116 can be coupled to the camera (visible light camera 2006, infrared emitter 2008, or infrared camera 2010), the image display driver 2020, the user input device 2028 (e.g., touch sensor or push button), and the memory 2002.

The head-wearable apparatus 116 is connected to a host computer. For example, the head-wearable apparatus 116 is paired with the mobile device 114 via the high-speed wireless connection 2014 or connected to the server system 2004 via the network 2016. The server system 2004 may be one or more computing devices as part of a service or network computing system, for example, that includes a processor, a memory, and network communication interface to communicate over the network 2016 with the mobile device 114 and the head-wearable apparatus 116.

The mobile device 114 includes a processor and a network communication interface coupled to the processor. The network communication interface allows for communication over the network 2016, low-power wireless connection 2012, or high-speed wireless connection 2014. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 2020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 2004, such as the user input device 2028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 2012 and high-speed wireless connection 2014 from the mobile device 114 via the low-power wireless circuitry 2034 or high-speed wireless circuitry 2032.

Any biometric data collected by biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Machine Architecture

Figure 21:
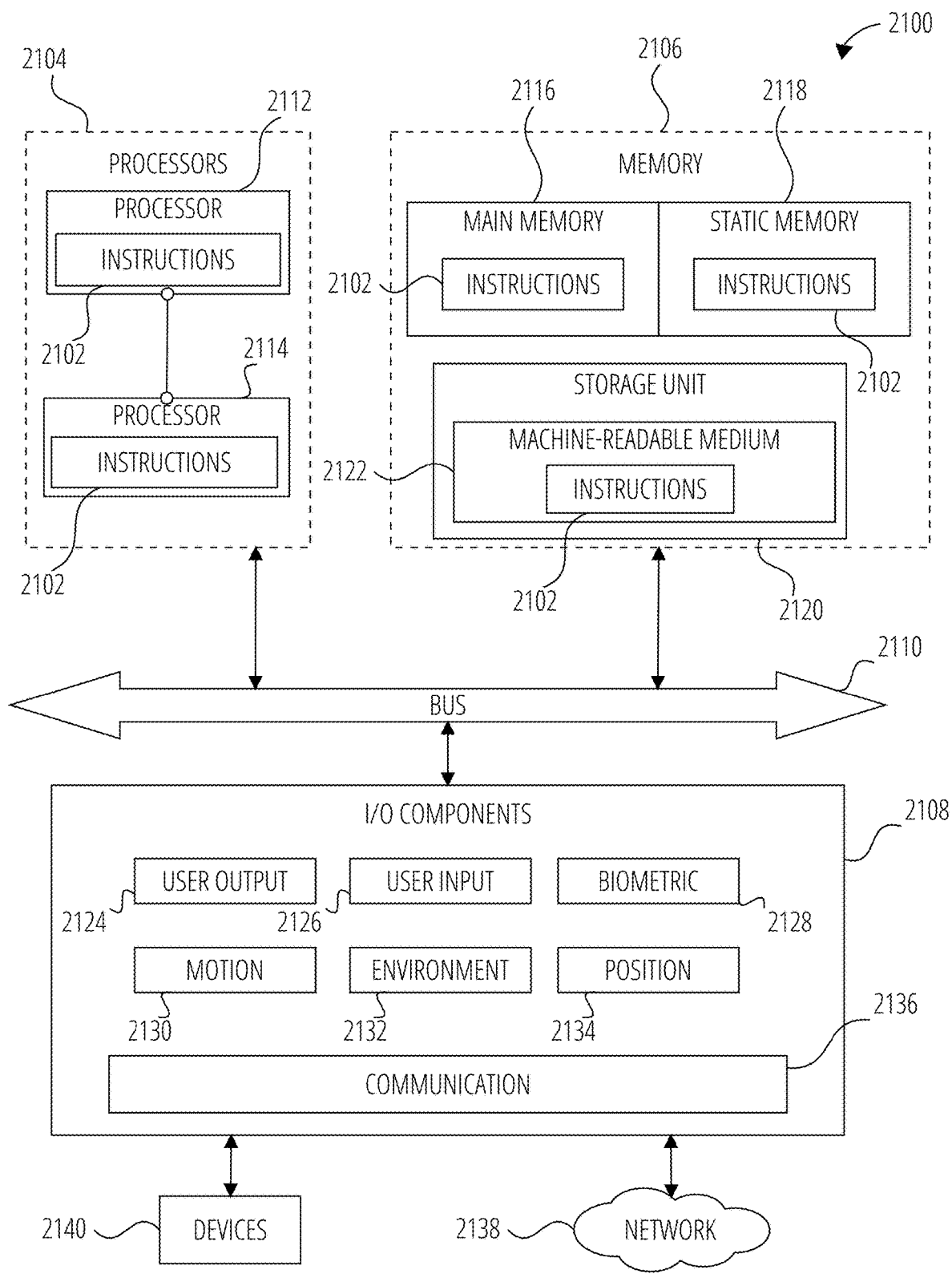
FIG. 21 is a diagrammatic representation of a machine in the form of a computer system within which a set of instructions may be executed to cause the machine to perform any one or more of the methodologies discussed herein, according to some examples.

FIG. 21 is a diagrammatic representation of a machine 2100 within which instructions 2102 (e.g., software, a program, an application, an applet, an app, or other executable code) for causing the machine 2100 to perform any one or more of the methodologies discussed herein may be executed. For example, the instructions 2102 may cause the machine 2100 to execute any one or more of the methods described herein. The instructions 2102 transform the general, non-programmed machine 2100 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2102, sequentially or otherwise, that specify actions to be taken by the machine 2100. Further, while a single machine 2100 is illustrated, the term "machine" shall also be taken to include a collection of machines that individually or jointly execute the instructions 2102 to perform any one or more of the methodologies discussed herein. The machine 2100, for example, may comprise the user system 102 or any one of multiple server devices forming part of the interaction server system 110. In some examples, the machine 2100 may also comprise both client and server systems, with certain operations of a particular method or algorithm being performed on the server-side and with certain operations of the particular method or algorithm being performed on the client-side.

The machine 2100 may include processors 2104, memory 2106, and input/output I/O components 2108, which may be configured to communicate with each other via a bus 2110. In an example, the processors 2104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2112 and a processor 2114 that execute the instructions 2102. The term "processor" is intended to include multi-core processors that may comprise two or more independent processors (sometimes referred to as "cores") that may execute instructions contemporaneously. Although FIG. 21 shows multiple processors 2104, the machine 2100 may include a single processor with a single-core, a single processor with multiple cores (e.g., a multi-core processor), multiple processors with a single core, multiple processors with multiples cores, or any combination thereof.

The memory 2106 includes a main memory 2116, a static memory 2118, and a storage unit 2120, both accessible to the processors 2104 via the bus 2110. The main memory 2106, the static memory 2118, and storage unit 2120 store the instructions 2102 embodying any one or more of the methodologies or functions described herein. The instructions 2102 may also reside, completely or partially, within the main memory 2116, within the static memory 2118, within machine-readable medium 2122 within the storage unit 2120, within at least one of the processors 2104 (e.g., within the processor's cache memory), or any suitable combination thereof, during execution thereof by the machine 2100.

The I/O components 2108 may include a wide variety of components to receive input, provide output, produce output, transmit information, exchange information, capture measurements, and so on. The specific I/O components 2108 that are included in a particular machine will depend on the type of machine. For example, portable machines such as mobile phones may include a touch input device or other such input mechanisms, while a headless server machine will likely not include such a touch input device. It will be appreciated that the I/O components 2108 may include many other components that are not shown in FIG. 21. In various examples, the I/O components 2108 may include user output components 2124 and user input components 2126. The user output components 2124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2108 may include biometric components 2128, motion components 2130, environmental components 2132, or position components 2134, among a wide array of other components. For example, the biometric components 2128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2130 include acceleration sensor components (e.g., accelerometer), gravitation sensor components, rotation sensor components (e.g., gyroscope).

The environmental components 2132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 2134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2108 further include communication components 2136 operable to couple the machine 2100 to a network 2138 or devices 2140 via respective coupling or connections. For example, the communication components 2136 may include a network interface component or another suitable device to interface with the network 2138. In further examples, the communication components 2136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2140 may be another machine or any of a wide variety of peripheral devices (e.g., a peripheral device coupled via a USB).

Moreover, the communication components 2136 may detect identifiers or include components operable to detect identifiers. For example, the communication components 2136 may include Radio Frequency Identification (RFID)

tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2136, such as location via Internet Protocol (IP) geolocation, location via Wi-Fi® signal triangulation, location via detecting an NFC beacon signal that may indicate a particular location, and so forth.

The various memories (e.g., main memory 2116, static memory 2118, and memory of the processors 2104) and storage unit 2120 may store one or more sets of instructions and data structures (e.g., software) embodying or used by any one or more of the methodologies or functions described herein. These instructions (e.g., the instructions 2102), when executed by processors 2104, cause various operations to implement the disclosed examples.

The instructions 2102 may be transmitted or received over the network 2138, using a transmission medium, via a network interface device (e.g., a network interface component included in the communication components 2136) and using any one of several well-known transfer protocols (e.g., hypertext transfer protocol (HTTP)). Similarly, the instructions 2102 may be transmitted or received using a transmission medium via a coupling (e.g., a peer-to-peer coupling) to the devices 2140.

Software Architecture

Figure 22:
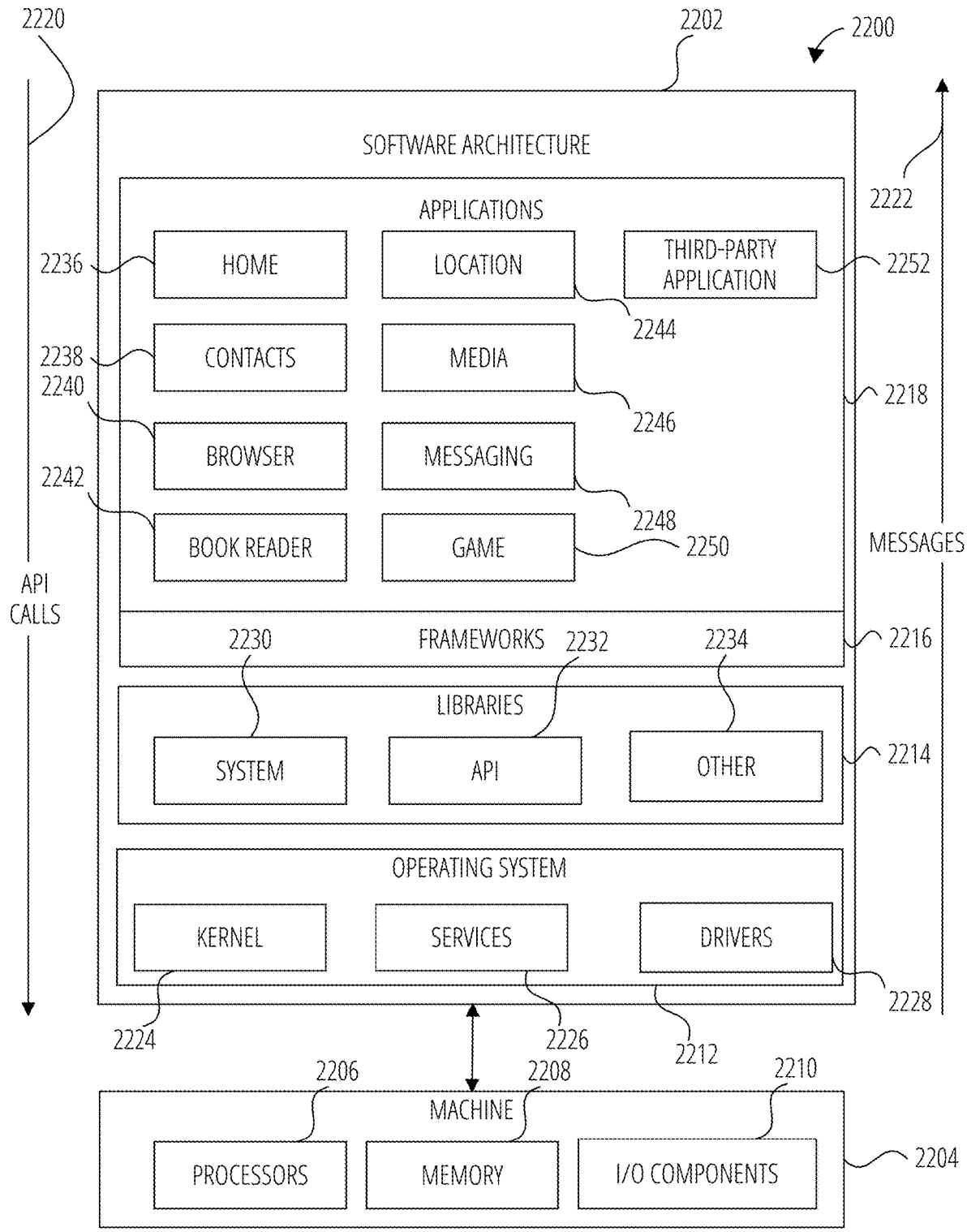
FIG. 22 is a block diagram showing a software architecture within which examples may be implemented.

FIG. 22 is a block diagram 2200 illustrating a software architecture 2202, which can be installed on any one or more of the devices described herein. The software architecture 2202 is supported by hardware such as a machine 2204 that includes processors 2206, memory 2208, and I/O components 2210. In this example, the software architecture 2202 can be conceptualized as a stack of layers, where each layer provides a particular functionality. The software architecture 2202 includes layers such as an operating system 2212, libraries 2214, frameworks 2216, and applications 2218. Operationally, the applications 2218 invoke API calls 2220 through the software stack and receive messages 2222 in response to the API calls 2220.

The operating system 2212 manages hardware resources and provides common services. The operating system 2212 includes, for example, a kernel 2224, services 2226, and drivers 2228. The kernel 2224 acts as an abstraction layer between the hardware and the other software layers. For example, the kernel 2224 provides memory management, processor management (e.g., scheduling), component management, networking, and security settings, among other functionalities. The services 2226 can provide other common services for the other software layers. The drivers 2228 are responsible for controlling or interfacing with the underlying hardware. For instance, the drivers 2228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2214 provide a common low-level infrastructure used by the applications 2218. The libraries 2214 can include system libraries 2230 (e.g., C standard library) that provide functions such as memory allocation functions, string manipulation functions, mathematic functions, and the like. In addition, the libraries 2214 can include API libraries 2232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2214 can also include a wide variety of other libraries 2234 to provide many other APIs to the applications 2218.

The frameworks 2216 provide a common high-level infrastructure that is used by the applications 2218. For example, the frameworks 2216 provide various graphical user interface (GUI) functions, high-level resource management, and high-level location services. The frameworks 2216 can provide a broad spectrum of other APIs that can be used by the applications 2218, some of which may be specific to a particular operating system or platform.

In an example, the applications 2218 may include a home application 2236, a contacts application 2238, a browser application 2240, a book reader application 2242, a location application 2244, a media application 2246, a messaging application 2248, a game application 2250, and a broad assortment of other applications such as a third-party application 2252. The applications 2218 are programs that execute functions defined in the programs. Various programming languages can be employed to create one or more of the applications 2218, structured in a variety of manners, such as object-oriented programming languages (e.g., Objective-C, Java, or C++) or procedural programming languages (e.g., C or assembly language). In a specific example, the third-party application 2252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2252 can invoke the API calls 2220 provided by the operating system 2212 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, configure the at least one processor to perform operations comprising: receiving, from a user device of a viewing user of an interaction system, a content request; responsive to receiving the content request, causing presentation, by an interaction application executing at the user device, of a viewing user interface that includes, a content zone and an interaction zone, a third-party content item being presented in the content zone, the third-party content item forming part of a content collection that is navigable by performing a navigation gesture, wherein the interaction zone comprises: a first interaction subzone located in a lower section of the viewing user interface outside of the content zone, the first interaction subzone including a user-selectable interaction element, and a second interaction subzone positioned adjacent to the first interaction subzone in the lower section of the viewing user interface, the second interaction subzone being located inside of the content zone and including a user-selectable context element that is overlaid on the third-party content item; detecting an interaction gesture directed at the interaction zone; and responsive to detecting the interaction gesture, causing an automatic transition of the interaction application from a viewing state to an interaction state.

In Example 2, the subject matter of Example 1 includes, wherein the content collection is a content collection of a third-party user of the interaction system, and wherein the navigation gesture is a tapping gesture directed at a navigation zone of the viewing user interface that is located inside of the content zone and that excludes the second interaction subzone.

In Example 3, the subject matter of Examples 1-2 includes, wherein the second interaction subzone comprises a context tray that includes the user-selectable context element, the user-selectable context element being at least one of an augmentation identifier, a location identifier, or a user identifier of a third-party user associated with the third-party content item.

In Example 4, the subject matter of Examples 1-3 includes, wherein the second interaction subzone further comprises a set of user-selectable action elements, the action elements being presented in a stacked arrangement.

In Example 5, the subject matter of Example 4 includes, wherein the action elements include a relationship request element that is user-selectable to initiate establishment of a relationship, within the interaction system, between the viewing user and a third-party user associated with the third-party content item.

In Example 6, the subject matter of Examples 1-5 includes, wherein the interaction element comprises a reply element that enables the viewing user to generate a reply message to the third-party content item.

In Example 7, the subject matter of Example 6 includes, wherein the reply element comprises a reply camera element that is user-selectable to invoke a reply camera function of the interaction application.

In Example 8, the subject matter of Examples 6-7 includes, wherein the reply element comprises a text input field that enables the viewing user to generate text of the reply message.

In Example 9, the subject matter of Examples 1-8 includes, wherein an augmentation is applied to the third-party content item, the interaction element including a visual identifier of the augmentation and being user-selectable to generate a user input content item that includes the augmentation.

In Example 10, the subject matter of Examples 1-9 includes, wherein causing presentation of the viewing user interface comprises populating the interaction zone based on whether a predefined relationship between the viewing user and a third-party user associated with the third-party content item is recorded within the interaction system.

In Example 11, the subject matter of Example 10 includes, wherein causing presentation of the viewing user interface further comprises: detecting that the predefined relationship between the viewing user and the third-party user is recorded within the interaction system; and in response to detecting that the predefined relationship is recorded, rendering the interaction element in the first interaction subzone as a reply element.

In Example 12, the subject matter of Examples 10-11 includes, wherein causing presentation of the viewing user interface further comprises: detecting that the predefined relationship between the viewing user and the third-party user is not recorded within the interaction system; and in response to detecting that the predefined relationship is not recorded, rendering the interaction element in the first interaction subzone as an alternative interaction element, the alternative interaction element being based on a context associated with the third-party content item.

In Example 13, the subject matter of Example 12 includes, wherein an augmentation is applied to the third-party content item, the alternative interaction element including a visual identifier of the augmentation and being user-selectable to generate a user input content item that includes the augmentation.

In Example 14, the subject matter of Examples 1-13 includes, wherein causing presentation of the viewing user interface further comprises: determining a primary context associated with the third-party content item; and linking the interaction element to the primary context such that user selection of the interaction element invokes a function associated with the primary context within the interaction application.

In Example 15, the subject matter of Example 14 includes, wherein the primary context is determined based on the context element within the second interaction subzone.

In Example 16, the subject matter of Examples 1-15 includes, wherein causing presentation of the viewing user interface further comprises: rendering the interaction element within the viewing user interface by invoking an animation function of the interaction application to transition the first interaction subzone from an empty state to a populated state.

In Example 17, the subject matter of Examples 1-16 includes, wherein the content zone includes a progress bar that is overlaid on the third-party content item.

In Example 18, the subject matter of Examples 1-17 includes, wherein the content request comprises a selection, by the viewing user, of the content collection.

Example 19 is a method comprising: receiving, from a user device of a viewing user of an interaction system, a content request; responsive to receiving the content request, causing presentation, by an interaction application executing at the user device, of a viewing user interface that includes, a content zone and an interaction zone, a third-party content item being presented in the content zone, the third-party content item forming part of a content collection that is navigable by performing a navigation gesture, wherein the interaction zone comprises: a first interaction subzone located in a lower section of the viewing user interface outside of the content zone, the first interaction subzone including a user-selectable interaction element, and a second interaction subzone positioned adjacent to the first interaction subzone in the lower section of the viewing user interface, the second interaction subzone being located inside of the content zone and including a user-selectable context element that is overlaid on the third-party content item; detecting an interaction gesture directed at the interaction zone; and responsive to detecting the interaction gesture, causing an automatic transition of the interaction application from a viewing state to an interaction state.

Example 20 is a non-transitory computer-readable storage medium, the computer-readable storage medium including instructions that when executed by at least one computer, cause the at least one computer to perform operations comprising: receiving, from a user device of a viewing user of an interaction system, a content request; responsive to receiving the content request, causing presentation, by an interaction application executing at the user device, of a viewing user interface that includes, a content zone and an interaction zone, a third-party content item being presented in the content zone, the third-party content item forming part of a content collection that is navigable by performing a navigation gesture, wherein the interaction zone comprises: a first interaction subzone located in a lower section of the viewing user interface outside of the content zone, the first interaction subzone including a user-selectable interaction element, and a second interaction subzone positioned adjacent to the first interaction subzone in the lower section of the viewing user interface, the second interaction subzone being located inside of the content zone and including a user-selectable context element that is overlaid on the third-party content item; detecting an interaction gesture directed at the interaction zone; and responsive to detecting the interaction gesture, causing an automatic transition of the interaction application from a viewing state to an interaction state.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

In examples described in the present disclosure, gestures such as tapping gestures or swiping gestures are touch gestures directed at the (touch-sensitive) screen of a user device. It should be appreciated that, while examples described herein illustrate gesture-based interface transitions with reference to touch gestures, techniques described herein may be applied using other types of operations or gestures that do not involve direct touching of a screen or other component or device. Example gestures may be performed using any suitable user input element, e.g., a finger, a stylus, or other input device.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, or processes described herein may be used independently of one another, or may be combined in various ways. All possible combinations and subcombinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," or "user device," refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User input content" refers to any form of content that may be posted, published, shared, sent, received or interacted with by a user, e.g., using an online platform. User input content may, for example, include digital content in the form of one or more image, photo, video clip, audio clip, text, or a combination thereof. A user input content item may, in some examples, be a UGC (user-generated content) item. User input content may, for example, have an augmentation applied to it (e.g., a lens, a filter, a media overlay, or other augmentation) and may thus be an augmented reality content item. A user input content item may be generated by a user, for example, where the content item is captured by a user using a digital camera of a user device, or, for example, where the content item is created by the user by applying an augmentation to another content item. A user input content item may be user-selected, for example, where the content item is selected from a media library or file storage, or, for example, sourced from a third party or third-party device. User input content may also include partially or fully computer-generated content, e.g., content created through generative artificial intelligence. A content item may, for example, be content data, such as a picture, video or audio data (or combinations thereof).

What is claimed is:

1. A system comprising:
   at least one processor; and
   at least one memory storing instructions that, when executed by the at least one processor, configure the at least one processor to perform operations comprising:
   receiving, from a user device of a viewing user of an interaction system, a content request;
   in response to receiving the content request, causing presentation, by an interaction application executing at the user device, of a viewing user interface that includes a content zone, a navigation zone, and an interaction zone, a third-party content item being presented in the content zone, the third-party content item forming part of a content collection of a third-party user that is navigable by performing a navigation gesture, and the navigation gesture comprising a tapping gesture directed at the navigation zone;
   wherein the navigation zone is located inside of the content zone and comprises a left navigation zone for navigating back within the content collection and a right navigation zone for navigating forward within the content collection;
   wherein the interaction zone comprises:
   a first interaction subzone located in a lower section of the viewing user interface outside of the content zone, and
   a second interaction subzone positioned adjacent to the first interaction subzone in the lower section of the viewing user interface, the second interaction subzone located inside of the content zone and including a user-selectable context element that is overlaid on the third-party content item, the navigation zone excluding the second interaction subzone;
   wherein causing the presentation of the viewing user interface comprises populating the interaction zone by:
   identifying an augmentation applied to the third-party content item;
   detecting absence of a bidirectional relationship between the viewing user and the third-party user; and
   based on identifying the augmentation and detecting the absence of the bidirectional relationship, including, in the first interaction subzone, a user-selectable interaction element associated with a content augmentation function;
   detecting an interaction gesture directed at the interaction zone, the interaction gesture comprising selection of the user-selectable interaction element; and
   in response to detecting the interaction gesture, causing an automatic transition of the interaction application from a viewing state to an interaction state in which the content augmentation function is activated to apply the augmentation to a new content item created by the viewing user.

2. The system of claim 1, wherein the second interaction subzone comprises a context tray that includes the user-selectable context element, the user-selectable context element comprising at least one of an augmentation identifier, a location identifier, or a user identifier of the third-party user.

3. The system of claim 1, wherein the second interaction subzone further comprises a set of user-selectable action elements, the set of user-selectable action elements presented in a stacked arrangement.

4. The system of claim 3, wherein the set of user-selectable action elements include a relationship request element that is user-selectable to initiate establishment of a relationship, within the interaction system, between the viewing user and the third-party user.

5. The system of claim 1, wherein the first interaction subzone is further populated with a visual identifier of the augmentation.

6. The system of claim 1, wherein causing the presentation of the viewing user interface further comprises:
determining a primary context associated with the third-party content item, the primary context indicative of the augmentation; and
linking the user-selectable interaction element to the primary context such that user selection of the user-selectable interaction element invokes the content augmentation function.

7. The system of claim 6, wherein the primary context is determined based on the user-selectable context element within the second interaction subzone.

8. The system of claim 1, wherein causing the presentation of the viewing user interface further comprises:
rendering the user-selectable interaction element within the viewing user interface by invoking an animation function of the interaction application to transition the first interaction subzone from an empty state to a populated state.

9. The system of claim 1, wherein the content zone includes a progress bar that is overlaid on the third-party content item and that indicates progress relative to content items in the content collection.

10. The system of claim 1, wherein the content request comprises a selection, by the viewing user, of the content collection.

11. A method comprising:
receiving, from a user device of a viewing user of an interaction system, a content request;
in response to receiving the content request, causing presentation, by an interaction application executing at the user device, of a viewing user interface that includes a content zone, a navigation zone, and an interaction zone, a third-party content item being presented in the content zone, the third-party content item forming part of a content collection of a third-party user that is navigable by performing a navigation gesture, and the navigation gesture comprising a tapping gesture directed at the navigation zone;
wherein the navigation zone is located inside of the content zone and comprises a left navigation zone for navigating back within the content collection and a right navigation zone for navigating forward within the content collection;
wherein the interaction zone comprises:
a first interaction subzone located in a lower section of the viewing user interface outside of the content zone, and
a second interaction subzone positioned adjacent to the first interaction subzone in the lower section of the viewing user interface, the second interaction subzone located inside of the content zone and including a user-selectable context element that is overlaid on the third-party content item, the navigation zone excluding the second interaction subzone;
wherein causing the presentation of the viewing user interface comprises populating the interaction zone by:
identifying an augmentation applied to the third-party content item;
detecting absence of a bidirectional relationship between the viewing user and the third-party user; and
based on identifying the augmentation and detecting the absence of the bidirectional relationship, including, in the first interaction subzone, a user-selectable interaction element associated with a content augmentation function;
detecting an interaction gesture directed at the interaction zone, the interaction gesture comprising selection of the user-selectable interaction element; and
in response to detecting the interaction gesture, causing an automatic transition of the interaction application from a viewing state to an interaction state in which the content augmentation function is activated to apply the augmentation to a new content item created by the viewing user.

12. The method of claim 11, wherein the second interaction subzone comprises a context tray that includes the user-selectable context element, the user-selectable context element comprising at least one of an augmentation identifier, a location identifier, or a user identifier of the third-party user.

13. The method of claim 11, wherein the second interaction subzone further comprises a set of user-selectable action elements, the set of user-selectable action elements presented in a stacked arrangement.

14. The method of claim 13, wherein the set of user-selectable action elements include a relationship request element that is user-selectable to initiate establishment of a relationship, within the interaction system, between the viewing user and the third-party user.

15. The method of claim 11, wherein the first interaction subzone is further populated with a visual identifier of the augmentation.

16. The method of claim 11, wherein causing the presentation of the viewing user interface further comprises:
determining a primary context associated with the third-party content item, the primary context indicative of the augmentation; and
linking the user-selectable interaction element to the primary context such that user selection of the user-selectable interaction element invokes the content augmentation function.

17. The method of claim 16, wherein the primary context is determined based on the user-selectable context element within the second interaction subzone.

18. The method of claim 11, wherein causing the presentation of the viewing user interface further comprises:
rendering the user-selectable interaction element within the viewing user interface by invoking an animation function of the interaction application to transition the first interaction subzone from an empty state to a populated state.

19. A non-transitory computer-readable storage medium, the computer-readable storage medium including instructions that when executed by at least one computer, cause the at least one computer to perform operations comprising:
receiving, from a user device of a viewing user of an interaction system, a content request;
in response to receiving the content request, causing presentation, by an interaction application executing at the user device, of a viewing user interface that includes a content zone, a navigation zone, and an interaction zone, a third-party content item being presented in the content zone, the third-party content item forming part of a content collection of a third-party user that is navigable by performing a navigation gesture, and the navigation gesture comprising a tapping gesture directed at the navigation zone;
wherein the navigation zone is located inside of the content zone and comprises a left navigation zone for navigating back within the content collection and a right navigation zone for navigating forward within the content collection;

wherein the interaction zone comprises:
- a first interaction subzone located in a lower section of the viewing user interface outside of the content zone, and
- a second interaction subzone positioned adjacent to the first interaction subzone in the lower section of the viewing user interface, the second interaction subzone being-located inside of the content zone and including a user-selectable context element that is overlaid on the third-party content item, the navigation zone excluding the second interaction subzone;

wherein causing the presentation of the viewing user interface comprises populating the interaction zone by:
- identifying an augmentation applied to the third-party content item;
- detecting absence of a bidirectional relationship between the viewing user and the third-party user; and
- based on identifying the augmentation and detecting the absence of the bidirectional relationship, including, in the first interaction subzone, a user-selectable interaction element associated with a content augmentation function;

detecting an interaction gesture directed at the interaction zone, the interaction gesture comprising selection of the user-selectable interaction element; and in response to detecting the interaction gesture, causing an automatic transition of the interaction application from a viewing state to an interaction state in which the content augmentation function is activated to apply the augmentation to a new content item created by the viewing user.

* * * * *